US011128682B2

(12) United States Patent
Halepovic et al.

(10) Patent No.: US 11,128,682 B2
(45) Date of Patent: Sep. 21, 2021

(54) VIDEO STREAMING AT MOBILE EDGE

(71) Applicant: AT&T Intellectual Property I, L.P., Atlanta, GA (US)

(72) Inventors: Emir Halepovic, Somerset, NJ (US); Ibrahim Ben Mustafa, Norfolk, VA (US); Tamer Nadeem, Chantilly, VA (US)

(73) Assignees: AT&T Intellectual Property I, L.P., Atlanta, GA (US); Old Dominion University Research Foundation, Norfolk, VA (US)

( * ) Notice: Subject to any disclaimer, the term of this patent is extended or adjusted under 35 U.S.C. 154(b) by 5 days.

(21) Appl. No.: 16/207,260

(22) Filed: Dec. 3, 2018

(65) Prior Publication Data
US 2020/0177652 A1  Jun. 4, 2020

(51) Int. Cl.
*H04L 29/06* (2006.01)
*H04L 12/853* (2013.01)
*H04W 88/02* (2009.01)

(52) U.S. Cl.
CPC ...... *H04L 65/4069* (2013.01); *H04L 47/2416* (2013.01); *H04W 88/02* (2013.01)

(58) Field of Classification Search
CPC . H04L 64/4069; H04L 47/2416; H04W 88/02
See application file for complete search history.

(56) References Cited

U.S. PATENT DOCUMENTS

| 7,551,734 | B2 | 6/2009 | Raesaenen et al. |
| 8,559,465 | B2 | 10/2013 | Rieger et al. |
| 9,007,914 | B2 | 4/2015 | Leung et al. |
| 9,485,689 | B2 | 11/2016 | Farmanbar et al. |

(Continued)

FOREIGN PATENT DOCUMENTS

| EP | 1499080 B1 | 10/2008 |
| JP | 2004015761 A | 1/2004 |

(Continued)

OTHER PUBLICATIONS

Kleinrouweler et al, Modeling Stability and Bitrate of Network-Assisted HTTP Adaptive Streaming Players, 2015, IEEE, pp. 177-184 (Year: 2015).*

(Continued)

*Primary Examiner* — John A Follansbee
*Assistant Examiner* — Raqiul A Choudhury
(74) *Attorney, Agent, or Firm* — Guntin & Gust, PLC; Ralph Trementozzi

(57) ABSTRACT

Aspects of the subject disclosure may include, for example, a method comprising sending context information from a mobile wireless device through a control channel to a network server; receiving a policy at the mobile wireless device from the network server, wherein the policy assigns a video streaming bit rate to the mobile wireless device based on the context information; and implementing the policy to control a video streaming session between the mobile wireless device and a media server over a data channel. The context information may include information about the mobile wireless device and/or a user of the mobile wireless device. The policy may be different for each mobile wireless device. Other embodiments are disclosed.

20 Claims, 16 Drawing Sheets

(56) References Cited

U.S. PATENT DOCUMENTS

| | | | |
|---|---|---|---|
| 9,705,771 B2* | 7/2017 | Raleigh | H04L 67/2804 |
| 9,723,267 B2 | 8/2017 | Carlucci et al. | |
| 9,819,540 B1 | 11/2017 | Bahadur et al. | |
| 9,898,600 B2 | 2/2018 | Kim et al. | |
| 9,949,272 B2 | 4/2018 | Jeon et al. | |
| 10,028,167 B2 | 7/2018 | Calin et al. | |
| 10,051,302 B2 | 8/2018 | Hasek et al. | |
| 10,057,609 B2 | 8/2018 | Rieger et al. | |
| 2008/0235746 A1 | 9/2008 | Peters et al. | |
| 2012/0278496 A1* | 11/2012 | Hsu | H04N 21/4424 709/231 |
| 2013/0272121 A1 | 10/2013 | Stanwood et al. | |
| 2013/0332620 A1* | 12/2013 | Gahm | H04N 21/6373 709/231 |
| 2014/0032781 A1* | 1/2014 | Casey | H04L 29/06027 709/233 |
| 2014/0237079 A1* | 8/2014 | Lockerbie | H04N 21/2146 709/218 |
| 2014/0269658 A1* | 9/2014 | Sadasivam | H04W 72/0406 370/338 |
| 2015/0281299 A1* | 10/2015 | Moustafa | H04L 65/60 709/219 |
| 2016/0142902 A1* | 5/2016 | Ramamurthi | H04L 65/607 370/328 |
| 2016/0156520 A1 | 6/2016 | Scully et al. | |
| 2016/0227443 A1 | 8/2016 | Tomici et al. | |
| 2016/0254959 A1 | 9/2016 | Arndt | |
| 2016/0302148 A1* | 10/2016 | Buck | H04W 52/0277 |
| 2017/0293352 A1* | 10/2017 | Todeschini | G06F 3/013 |
| 2017/0303139 A1 | 10/2017 | Karandikar et al. | |
| 2017/0339110 A1 | 11/2017 | Ni | |
| 2017/0359616 A1 | 12/2017 | Sampson | |
| 2019/0013024 A1* | 1/2019 | Jeon | G10L 15/16 |
| 2019/0082338 A1* | 3/2019 | Dion | H04W 24/08 |
| 2019/0222803 A1* | 7/2019 | Pather | H04L 65/605 |

FOREIGN PATENT DOCUMENTS

| | | | |
|---|---|---|---|
| WO | 2017220132 A1 | 12/2017 | |
| WO | 2018001522 A1 | 1/2018 | |
| WO | 2018047168 A1 | 3/2018 | |

OTHER PUBLICATIONS

Bentaleb, Abdelhak et al., "SDNDASH: Improving QoE of HTTP adaptive streaming using software defined networking", Proceedings of the 2016 ACM on Multimedia Conference. ACM, 2016, pp. 1-10.

Cofano, G. et al., "Design and experimental evaluation of network-assisted strategies for HTTP adaptive streaming", Proceedings of the 7th International Conference on Multimedia Systems. ACM, 2016, pp. 1-12.

Lee, Jeongkeun et al., "mesdn: Mobile extension of sdn", Proceedings of the fifth international workshop on Mobile cloud computing & services. ACM, 2014.

Lin, Pingping et al., "WE-bridge: West-East Bridge for SDN inter-domain network peering", Computer Communications Workshops (INFOCOM WKSHPS), 2014 IEEE Conference, IEEE, 2014, pp. 1-2.

Mu, Mu et al., "A scalable user fairness model for adaptive video streaming over SDN-assisted future networks", IEEE Journal on Selected Areas in Communications 34.8 (2016): 2168-2184, pp. 1-33.

Parol, Pawel et al., "Towards networks of the future: SDN paradigm introduction to PON networking for business applications", Computer Science and Information Systems (FedCSIS), 2013 Federated Conference, IEEE, 2013.

Schmid, Stefan, "Exploiting locality in distributed SDN control", Proceedings of the second ACM SIGCOMM workshop on Hot topics in software defined networking. ACM, 2013, pp. 1-7.

Yi, Shanhe et al., "A survey of fog computing: concepts, applications and issues", Proceedings of the 2015 workshop on mobile big data. ACM, 2015, pp. 1-6.

* cited by examiner

VIDEO STREAMING AT MOBILE EDGE

STATEMENT AS TO FEDERALLY SPONSORED RESEARCH

This invention was made with government support under NSF Award CNS-1454284. EAGER: Bluetooth Open-Source Stack (BOSS)—A Flexible and Extensible Bluetooth Research Platform. The government has certain rights in the invention.

FIELD OF THE DISCLOSURE

The subject disclosure relates to a video streaming at mobile edge.

BACKGROUND

Current HTTP Adaptive Streaming (HAS) has become the prevalent paradigm for video delivery in today's Internet. In HAS, video content is encoded into multiple profiles (also known as tracks or quality levels), with each having different quality. With increasing picture quality, each such track has a higher bitrate, i.e. higher bandwidth requirement for delivery.

Each profile is split into segments, typically 2 to 10 seconds. Segment boundaries are the same time point in each profile, giving the player an opportunity to switch profiles at each segment boundary. Segments are available on conventional web servers via a standard HTTP request. A manifest file, which describes the available profiles, is downloaded by the player when starting the streaming session. Typical player behavior is to seek the highest available bitrate if bandwidth allows.

Most widely used protocols for HAS today are client-centric solutions, meaning all decisions are made on the client, leaving the server to only respond to the client's requests. This enables rapid deployment through the existing CDN infrastructure, which is the key enabler responsible for the prevalence of HAS.

The purpose of multiple bitrates and segmentation is to allow players to adapt to varying network conditions, typically according to throughput measurements. One of the major challenges in designing the adaptive algorithm of the HAS player is the adaptation logic that maximizes the viewing experience by appropriately reacting to changing bandwidth. In fact, most of the work in the literature tries to enhance the performance of video players by designing a better adaptation algorithm.

One challenge for competing players is to accurately estimate the available bandwidth, as any one player may perceive drastically different network condition depending on whether it competes with another player during a segment download. This contributes to unstable video quality for most current HAS players.

BRIEF DESCRIPTION OF THE DRAWINGS

Reference will now be made to the accompanying drawings, which are not necessarily drawn to scale, and wherein.

DETAILED DESCRIPTION

Figure 1:
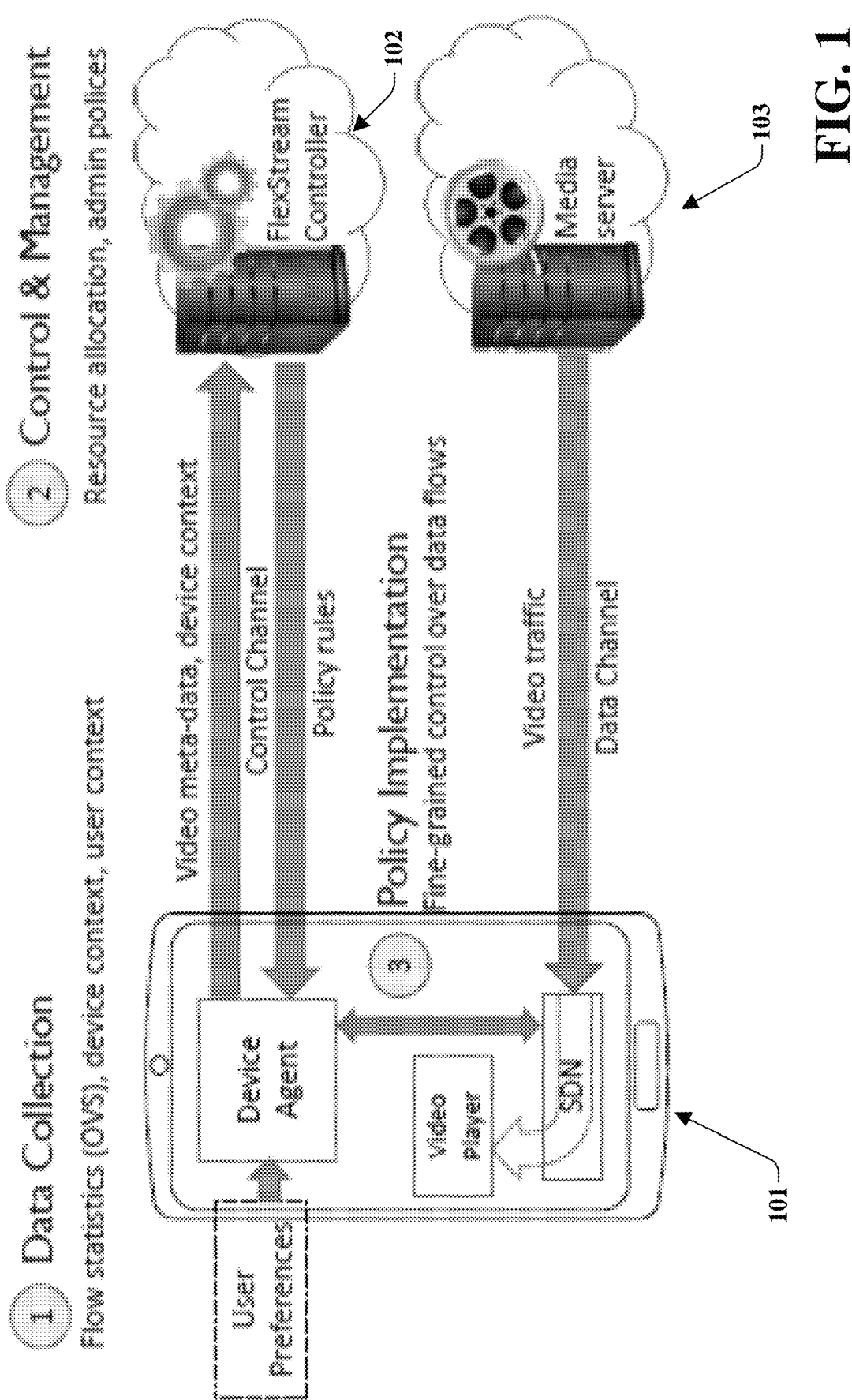
FIG. 1 is a block diagram illustrating an example, non-limiting embodiment of a system in accordance with various aspects described herein.

The subject disclosure describes, among other things, illustrative embodiments for controlling streaming, such as video streaming. Other embodiments are described in the subject disclosure.

One or more aspects of the subject disclosure include a system with a processor and a memory that stores executable instructions that, when executed by the processor, facilitate performance of operations. The operations may comprise obtaining context information from a mobile wireless device through a control channel; determining a policy according to the context information, wherein the policy assigns a bit rate to the mobile wireless device based on the context information; and providing the policy to the mobile wireless device over the control channel, thereby causing the mobile wireless device to implement the policy to control a video streaming session between the mobile wireless device and a media server over a data channel. The context information may include information about the mobile wireless device, such as a screen size, a screen resolution, a processor, and/or a memory capacity of the mobile wireless device. The context information may include an ambient lighting at the mobile wireless device. The context information may include information about a network connection of the mobile wireless device. The context information may include information about a user of the mobile wireless device, such as an engagement of the user with the mobile wireless device and/or whether the user is looking at the mobile wireless device. The policy may be different for each mobile wireless device.

One or more aspects of the subject disclosure include machine-readable medium, comprising executable instructions that, when executed by a processing system including a processor, facilitate performance of operations. The operations may comprise receiving context information from a mobile wireless device through a control channel; determining a policy according to the context information, wherein the policy assigns a bit rate for communications between the mobile wireless device and a media server over a data channel based on the context information; and transmitting the policy to the mobile wireless device over the control channel, wherein upon receipt of the policy the mobile wireless device implements the policy. The context information may include information about the mobile wireless device and/or a user of the mobile wireless device, as discussed above. The policy may be different for each mobile wireless device.

One or more aspects of the subject disclosure include a method comprising sending context information from a mobile wireless device through a control channel to a network server; receiving a policy at the mobile wireless device from the network server, wherein the policy assigns a video streaming bit rate to the mobile wireless device based on the context information; and implementing the policy to control a video streaming session between the mobile wireless device and a media server over a data channel. The context information may include information about the mobile wireless device and/or a user of the mobile wireless device, as discussed above. The policy may be different for each mobile wireless device.

Software-Defined Networking (SDN) is a promising technology to improve control and management of data networks, as well as reduce cost and spur network service innovation. This technology introduces a layered network architecture in which the control plane (i.e., control function such as routing, security, etc.) are decoupled from the data plane (forwarding function) of the network devices (e.g., switches), allowing for more sophisticated and flexible traffic management. An SDN instance mainly consists of three layers: application layer, control layer, and data layer. Applications, in the application layer, are programs that explicitly and directly communicate their network requirements and desired network behavior to the controller at the control layer via APIs utilizing a northbound interface. The control layer is responsible for accomplishing the goals of the target application through manipulating the forwarding devices via a dedicated controller as well as providing the applications with a holistic view of the network topology (e.g., flow statistics and events). The southbound interface of the SDN switch enables the controller to communicate with the data plane via a shared protocol, such as OpenFlow. The data plane handles the actual packets according to the configuration received from the controller and performs other tasks such as reporting.

In an SDN-enabled switch, such as Open vSwitch (OVS), the forwarding table is extended to the flow table that stores flow rules defining different actions to be applied on the incoming packets. Therefore, once a packet is received, the packet header fields are used to identify the flow and execute an action such as forwarding, dropping, modifying header fields, or sending to the controller for a new flow rule installation if there is no matching rule. Although SDN has been deployed in data centers and core networks, we develop and implement an OVS-based SDN functionality on end devices, such as mobile wireless devices. OVS actions may be leveraged to perform fine-grained control over the corresponding applications flows on the end devices. For example, a OVS action may be used for packetheader modification on a streaming flow to control data rate, while a drop action may be used when a policy dictates to completely block a background flow at specific times.

Select embodiments of the present disclosure are designed to maximize quality of experience (QoE) by allocating the highest sustainable bitrates to videos sessions while ensuring stable quality, minimal stalls, and well-balanced and fair QoE. We achieve this goal through a combination of centralized and distributed components deployed in network and end-devices, respectively. While a network element is primarily employed to manage resource allocation between video flows, monitoring and policy implementation tasks are offloaded to end-devices, via lightweight software agents. This alleviates the need for intrusive, large and costly traffic management solutions within the network, or modifications to servers.

FIG. 1 shows an exemplary system overview. In addition to the data channel the client uses for video data delivery, a Device Agent (DA) running on a user's equipment (UE) 101 opens a control channel to a network entity, such as a System Controller (FC) 102, dedicated for sending feedback information and receiving optimization policy decisions. The process of managing video sessions starts with data collection at end devices related to the video session, device characteristics, and context information, which are reported by the DA to the FC for processing. The FC 102 utilizes this information to detect bottlenecks and take control over network resources, if necessary. In this case, the FC 102 uses the received information as input to an optimization policy that maximizes QoE in the network or achieves any other objective. Bitrate allocation along with some dynamic policy rules, such as location or time context restrictions, are then sent to the DAs for implementation, via the deployment of the SDN data plane (extended OVS) and the control plane (Local Controller (LC)), on mobile devices, such as UE 101.

The OVS is installed with a new action added to the kernel module that compels the device to adjust the bandwidth consumption to a certain value, as directed by the LC according to the policy, to avoid player competition and improve video experience.

We note that the FC 102 could be deployed in the public or network operator clouds, or at the network edge. The FC 102 can be operated by content providers, network operators, or individuals in their private networks. Deployments at the wireless access points for home or enterprise networks, or at mobile edge nodes, would give the FC 102 a better view of network conditions and device contexts, enabling it to manage bandwidth over the shared bottlenecks more effectively. Certain embodiments take into consideration different context information as inputs to the global policy implemented by the FC 102. These context information may be classified into: (i) user context: priority class, preferences, and location, (ii) device context: screen size and battery level, (iii) network context: link condition and traffic types, and (iv) environment context: surrounding luminance. In fact, considering context information is crucial for achieving a high and balanced QoE in the network. For example, if we have multiple users with two different priorities (e.g., high and regular class) streaming over a shared bottleneck, allocating more resources to those with high priority (e.g., emergency services) to ensure higher video quality is essential for enabling service differentiation.

Figure 2:
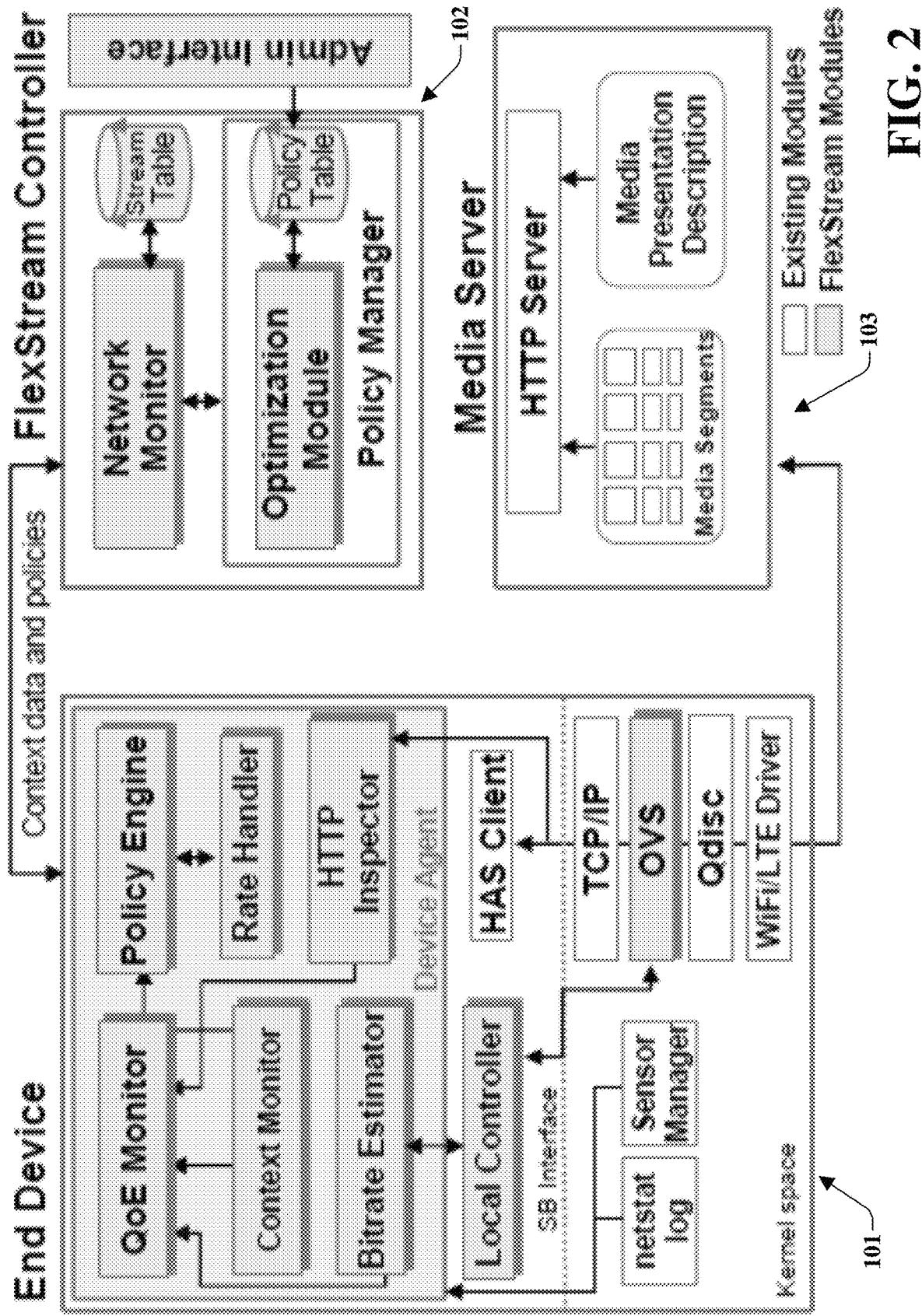
FIG. 2 is a block diagram illustrating an example, non-limiting embodiment of system components and exemplary modules of the system of FIG. 1 in accordance with various aspects described herein.

FIG. 2 shows exemplary system components and exemplary modules of select embodiments of this disclosure, which we may refer to herein as Flexstream. In one embodiment, there are three main components deployed on the end device: the DA, the LC, and the OVS. The DA runs in the background and oversees the functions of several modules, in addition to mediating communication between local components and the FC 102. The DA also listens to all important events (e.g., streaming start, bitrate switch) and monitors local context related to the video stream, and promptly informs the FC for an appropriate action. To reduce the overhead, the DA may be set to run every 2 seconds, although other time periods can be selected, which is usually the minimum interval between two consecutive video segment requests generated by adaptive players in the steady state. At each run, the DA sends an update to the FC 102. As an alternative approach, the update could be triggered by a change in the context including the average throughput, to reduce bandwidth overhead and avoid overloading the FC. Even with this periodic updates, the FC can always react quickly and before the QoE would be impacted in practice, since most adaptive players use around 30 seconds of playback buffer or more.

The DA can include several modules or components. The Context Monitor is initially responsible for observing and reporting a streaming event by combining data from netstat log and HTTP Inspector. One task of the HTTP Inspector is to report video encoding rates by inspecting the manifest file sent to the player prior to the streaming session. In some cases, it also inspects the HTTP requests periodically sent by the player to learn the bitrate of the newly requested segment. If the session is encrypted, then the Bitrate Estimator module is invoked to estimate the bitrate, which initially relies on recognizing the streaming application and then following the bitrate guidelines of its provider. Once the player reaches the steady state, the Bitrate Estimator starts a process of monitoring video flow statistics and patterns (segment size and ON/OFF duration), through SDN components, to make another estimation and adjust the assigned resources accordingly. This is to avoid inefficiency in utilizing network resources, when the assigned bandwidth is too high. In some embodiments, this module uses the length of ON/OFF periods of the adaptive player as an indicator of the error in bitrate estimation.

The Context Monitor may also oversee the device context which may contain both physical device characteristics, user preferences and administrative context as mentioned in the previous section, and reports the device context to the FC 102. Once the player starts streaming, the video quality is monitored by QoE Monitor module. To reduce overhead, the QoE Monitor is only required to periodically check the average throughput (through SDN components) to ensure the sustainability of the current bitrate. This eliminates the need for the HTTP Inspector to constantly inspect each HTTP request for the requested bitrate, as long as the average throughput does not fall below the target bitrate. The QoE Monitor may also inform the FC about any switch in the requested video bitrate or other context changes.

At the higher level, the Policy Engine is responsible for maintaining and implementing the policies received from the FC 102. This is achieved by instructing the LC to install new actions in the OVS flow table. Note that these policies are dynamic and programmed based on the context. For instance, the FC 102 can restrict streaming HD videos (due to high bitrate) at specific times or locations (base stations), or set the bitrate of background traffic to different values based on the application type generating the traffic. An adjustment of TCP receive window (RWIN) is one of the techniques that can be used to limit the TCP connection throughput. Thus, the Rate Handler module's role is to derive the appropriate RWIN from Round Trip Time (RTT) of video stream packets either upon a request or when there is a significant change in RTT that could impact throughput (±100 Kbps).

To modify the TCP packet RWIN in the data plane, the OVS can be leveraged on the end device. The OVS may use the extended OpenFlow protocol to receive the RWIN modification action and then insert it into the action field entry in the flow table. Once a match in the flow table is detected, then the RWIN field in the TCP header of the matched packet is modified to the received value. OVS is also leveraged to provide other functions including routing traffic between different network interfaces and collecting flow-based statistics. In select embodiments, when a background flow (e.g., an app update) starts competing with video flows, the OVS may route the background traffic over another network interface, if possible (according to user preferences). Finally, to control the OVS from the user space, the Local Controller (LC) may be employed a separate component from the DA to enable other systems to leverage SDN data plane for their own services. The LC represents the control plane in the SDN architecture. Its main function is to manage the OVS and handle the flow rules within the flow table, in addition to retrieving the flow information maintained in this table. The LC communicates with the DA through the northbound API in order to receive the control commands, and then uses the extended OpenFlow protocol through the southbound API to send a rate limiting action (and RWIN) to the OVS.

The FC 102 consists of the Network Monitor and Policy Manager. The Network Monitor tracks network conditions and device states, such as video QoE of all devices under control. To ensure stable and fair QoE in the network, the FC collects and maintains device context including video metadata, such as bitrate profiles, in the Stream Table.

Unlike some context information which is required at the beginning of the streaming session (e.g., device characteristics), other information are needed periodically or upon significant events, such as pause or end of stream, throughput change, etc. The Policy Table is used to hold the optimization policies set by the administrator. When bandwidth control is required to improve performance, the Optimization Module is invoked on the policy by the Policy Manager. It uses the information maintained in both tables to assign bandwidth to video flows according to the optimization policy.

When a packet arrives on the OVS kernel data path from the wireless interface, the OVS checks whether the packet matches any of its flow entries in the flow table. If the match is found, then the corresponding action is executed. This action may be to forward, drop, modify, or sample the packet, for example. Packet modification may be used to enable the TCP header update. The OVS is designed to perform a limited number of packet modification actions such as rewriting Ethernet/IP source or destination addresses. The challenge is that the action field for the set instruction in the flow table entry comes with a limited size. Adding a new action to this field requires a change in the size of the data structure of the flow table in the data path, but the modification needs to propagate to the user space and OpenFlow protocol.

Whenever a packet matches the flow entry, the execute set action function, which is responsible for modifying packet header fields in the data path, is invoked. This function in turn calls and passes the socket buffer sk_buff and the new rwin value, to our newly added function set_tcp_window, which modifies the TCP header after making it writeable in the sk_buff. We also modified the LC on the mobile device to support this new action by extending OpenFlow to support RWIN modification action as well.

It is challenging to bind OVS to the local network stack and add the 3G/LTE network interface as a port to OVS. While possible to successfully bind OVS to WiFi interface (wlan0), this fails on the cellular interface as it uses different technologies and protocols to connect to its base station. In fact, simply moving the IP address of the cellular interface to OVS is unattainable as it immediately breaks the connection between the end device and the base station, causing the interface configuration to reset and assign a new IP address. Due to this challenge, one way to avoid this problem is to utilize a WiFi access point as a mediator. However, this approach limits the practicality of such a solution. To overcome this challenge and allow for direct experimentation over cellular network, in at least one embodiment, we add the cellular interface with its IP address, assigned by the network, as a port to the OVS, which is configured with a different IP address. Then we install a number of rules to the OVS flow table to rewrite the destination IP and MAC addresses (for ingress packets) with OVS addresses, to force the traffic to go (to the upper layers) through OVS internal device once it hits the cellular interface. Similar actions are applied for egress traffic, but in this case the IP and MAC source addresses are overwritten with the cellular interface addresses instead. We also enable IP forwarding in the kernel space and make appropriate changes to the routing table.

In one embodiment, rate limiting can be implemented through TCP RWIN adjustment, by computing RTT×rate-limit, as a technique that is well-suited for our use case. It is superior to Linux Traffic Control (TC) Queuing discipline (Qdisc) policing based on token bucket for two key reasons. First, token bucket discards packets, which is a waste of bandwidth when ingress traffic at the end device is concerned, since packets have already traversed all bottlenecks. Second, RWIN adjustment reaches the server roughly within the sum of one-way delays between the end device and the servers (FC and video server), which is much faster and less disruptive to TCP than dropped packets. To determine the RTT value, we can modify the OVS to calculate the RTT for the actual video packets, but for simplicity we choose periodic ICMP pings.

Once the control is required over the bandwidth due to player competition, the optimization module is invoked to optimize resource allocation over a set of performance metrics that maximize the overall QoE across all users. In other words, the FC may engage when needed (such as when player competition, network congestion, or lower QoE is detected) to set policies for the various UE, but could also disengage and let each UE set their own policy when there is no longer player competition, network congestion, or lower QoE, such as non-busy hours when system low is relatively low. Specifically, in at least one embodiment, we formulate an optimization problem to determine the highest possible set of video bitrates across all sessions that guarantees a fair share of resources with minimum quality variations and stalls. To ensure well-balanced and optimal QoE, we consider several context factors in the formulation of the optimization problem including user priority, device capability (screen size), surrounding luminance, link condition and traffic type, to differentiate between video and background traffic.

Let B be the total bandwidth capacity that is available for N active video sessions. Note that B is determined from throughput feedback received from all DAs, hence we do not require visibility into the total bottleneck capacity. We assume that each requested video i is encoded at $K_i$ bitrates such that $r_{ij}$ denotes the bitrate j of video i. We define a utility $u_{ij}$ as a function of video bitrate that returns the value of selecting a bitrate j for video session i, and we define it as:

$$u_{ij} = \prod_{l=1}^{a} \beta_{il} \cdot \log(r_{ij}) \qquad (1)$$

Our choice of the logarithmic utility function comes primarily from its properties of diminishing returns as the bitrate increases, to ensure a proportional share of network resources among all users. To account for context factors in the utility, we weight the bitrate with a set of positive parameters corresponding for the considered context factors. For example, if we want to consider for user priority, screen size, surrounding luminance and background traffic for video session i, we choose a to be 4 and assign positive weights to $\beta_{i1}$, $\beta_{i2}$, $\beta_{i3}$, and $\beta_{i4}$ respectively. In this example, $\beta_{i2}$ expresses how much more value is assigned to a device with a large screen size (e.g., tablet) than to the one with a small screen size (e.g., phone). Given this utility function, the optimization problem is defined as the maximum sum of the utility functions $u_{ij}$ across all video sessions as follows:

$$\max_{x_{ij}} \sum_{i=1}^{N} \sum_{j=1}^{K_t} (u_{ij} - \mu \delta_{ij}) x_{ij} \qquad (2)$$

$$\text{subject to } \sum_{i=1}^{N} \sum_{j=1}^{K_t} (er_{ij}) x_{ij} \leq B \qquad (3)$$

$$\sum_{j=1}^{K_t} x_{ij} = 1, x_{ij} \in {0, 1} \; \forall \, i \quad (4)$$

where $\delta_{ij}$ is a penalty function that we use to minimize the fluctuation in the bitrate. Here, our definition of $\delta_{ij}$ can also assist in reducing stalls. The $\delta_{ij}$ function is of the form:

$$\delta_{ij} = \begin{cases} |r_{ij} - r_{ic}|s_i + \left(m - \left\lceil \frac{t_i}{k} \right\rceil \right), & t < t_{thresh} \\ |r_{ij} - r_{ic}|s_i, & t \geq t_{thresh} \end{cases} \quad (5)$$

This definition of $\delta_{ij}$ takes into consideration a number of important factors that impact the stability aspect of video QoE. First, the term $|r_{ij}-r_{ic}|$, where $r_{ic}$ denotes the current bitrate of video session i, ensures that the penalty increases in line with the amount of bitrate variation. Moreover, jumping several bitrates at once is not recommended and will result in a larger penalty which in turn reduces the possibility of having stalls by preventing a large cut in the assigned bandwidth to any video session. Moreover, this penalty increases as the total number of switches $s_i$ of session i increases. We also taking into account that there is enough time $t_{thresh}$ between any two switches that might be experienced. The term $(m-t_i/k)$, where m is the maximum penalty that can be applied while k is a scaling factor, will result in a significant penalty when the time period from the last switch $t_i$ is short. To implement the penalty function, each DA is required to maintain a history of the number of switches $s_i$ as well as recording the time of the last bitrate change $t_i$.

In the objective function (2), we include a tunable parameter μ to tradeoff between delivering high bitrate and stability. This parameter allows the network operator to customize or balance the objective between maximizing the bitrate delivery and stability. For instance, if the objective is to minimize the number of switches, then μ should be set to a large value, while assigning a small value to μ will result in higher average bitrate at the expense of stability. In our implementation, we set μ=1. The indicator variable $x_{ij}$ in the objective function is used to represent the selected video bitrate for session i such that $x_{ij}$ is equal 1 when bitrate version j is selected, and 0 otherwise. The inequality (3) indicates that the optimization formula in (2) is restricted by the total available bandwidth at the AP. In addition, we use a constant ϵ (e.g., ϵ=1.35) in (3) to account for the conservative behavior of adaptive players. Most adaptive players tend to keep a safety margin between the requested bitrate and available bandwidth to avoid any unnecessary bitrate variations.

The optimization problem (2) can be clearly mapped to a multiple-choice knapsack problem in which one item in each class of items must be selected with the objective of maximizing the profit without exceeding the knapsack capacity. Each video profile in our problem corresponds to a class of items while each bitrate that belongs to the video profile represents an item within that class. Similarly, the total available resource maps to the knapsack capacity, while the utility function represents the profit of selecting an item.

Intuitively, an exact solution for this problem can be obtained using Dynamic Programming (DP) within pseudo-polynomial time complexity. In order to apply DP, we start by defining a bandwidth step size s, which we use to discretize the total link capacity B into a series of Z incremental values $\{0, s, 2s, 3s, \ldots, zs, \ldots, B\}$. Then, for each video session i we calculate y(i, z) for each capacity value zs as follows:

$$y(i, z) = \max_{1 \leq j \leq K_i} \{h_{ij} | zs \geq w_{i,j}\}, \; \forall \, 0 \leq z \leq Z = B/s \quad (6)$$

where y(i, z) represents the maximum utility of video session i when the available bandwidth is zs, while $h_{ij}=(u_{ij}-\mu\delta_{ij})$, and $w_{i,j}=(\epsilon r_{ij})$ as defined in (2) and (3), respectively. Then, we can solve the problem via DP in a bottom-up fashion using the following recurrence:

$$Y(i, z) = \begin{cases} y(i, z), & i = 1, \forall \, z \\ \max_{0 \leq a \leq z} \{Y(i-1, a) + y(i, z-a)\}, & 2 \leq i, \forall \, z \end{cases} \quad (7)$$

where Y(i, z) is the total maximum utility that can be obtained for all i video sessions when the available bandwidth is zs. At each step, the optimal utility for session i is determined by selecting the highest utility among its K, bitrates under their bandwidth requirements zs–$w_{ij}$. Using this recurrence, we calculate Y(i, z) in a bottom-up fashion for all i and z until we calculate Y(N,Z) that represent the total maximum utility for all N video sessions when the available bandwidth is B. Once Y(N,Z) is obtained, we then perform a usual trace back to construct the optimal set of video bitrates that lead to the optimal solution. Given number of possible bitrates for a video session is quite limited in practice (e.g., $|K_i| \leq 10$), and careful implementation of the dynamic programming steps, the complexity of this solution will be O(NZ). Thus if we have N=400, K=8, B=200 Mbps, and s=100 Kbps, the execution time on a single-core Intel 2.20 GHz processor is about 400 ms. This small time overhead would allow the FC to react in time before the QoE can be affected. However, if the execution time occasionally becomes larger and above certain threshold, then we can speed up the execution time by reducing the granularity of z by increasing the bandwidth step size s without empirically sacrificing the optimality of the solution, or by utilizing one of the well-known approximate algorithms that guarantees faster execution to be within this sub-second level at the cost of deviating from the optimal solution.

In one experiment, we ran the FC 102 on a laptop connected to the Internet via a public IP address. We used three Android mobile devices (UE 102) with different screen sizes (Nexus 7 and two Nexus 4). To create a bottleneck in the way that works for both Wi-Fi and cellular scenarios, we placed a Squid proxy v3.1 downstream from a media server 103. The proxy controlled outbound bandwidth using Linux Traffic Control (TC). End devices were set up to forward HTTP traffic via the proxy. On the end devices, four main components are installed: DA, LC, OVS, and GPAC player. DA was implemented in Java and communicated with FC over TCP. To implement the LC, we developed a java code that utilizes the ovs-ofctl library which provides the functionality to monitor and administering OVS including modifying the flow table. The LC used OpenFlow v1.2 on the southbound interface to control and configure the OVS. We installed our modified version of OVS v1.11.0 after cross compiling it for our Android devices, and then we bound it to the wireless interface (wlan0/rmnet0) corresponding to the target network (Wi-Fi/cellular) to allow the traffic to pass through the OVS and perform the TCP window adjustment. We used a public H.264 encoded video "Big Buck Bunny", streamed from a server on the Internet. This 9-minute video is split into 4-second segments and comes with many bitrate profiles, from which we used 449, 843, 1416, and 2656 Kbps. The Android version of GPAC was v0.6.2-DEV (Osmo4). We modified the basic adaptation algorithm of GPAC to use the harmonic mean of measured throughput of the last five received segments for bandwidth estimation.

Given the above experimental setup, we evaluated an embodiment regarding stability and average bitrate over static and variable capacity bottlenecks, with and without background traffic.

Figure 3:
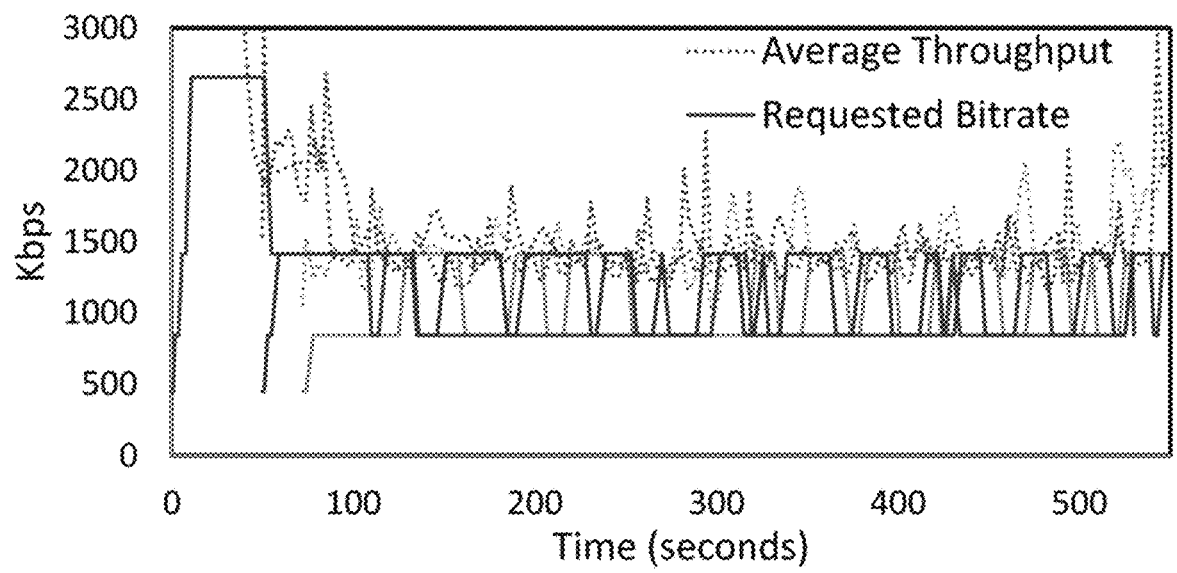
FIG. 3 is a graph illustrating that uncontrolled player competition causes frequent switching between bit rates.

The uncontrolled case of 3 players competing for 3800 Kbps bottleneck is presented in FIG. 3, showing the impact of competition on average throughput and requested bitrates. Even though that TCP-based players are expected to equally share the bandwidth, the intermittent traffic of HAS and selfish behavior of the adaptive algorithms leads to oscillations in throughput of all players, causing frequent switches between 843 and 1416 Kbps bitrates.

Figure 4:
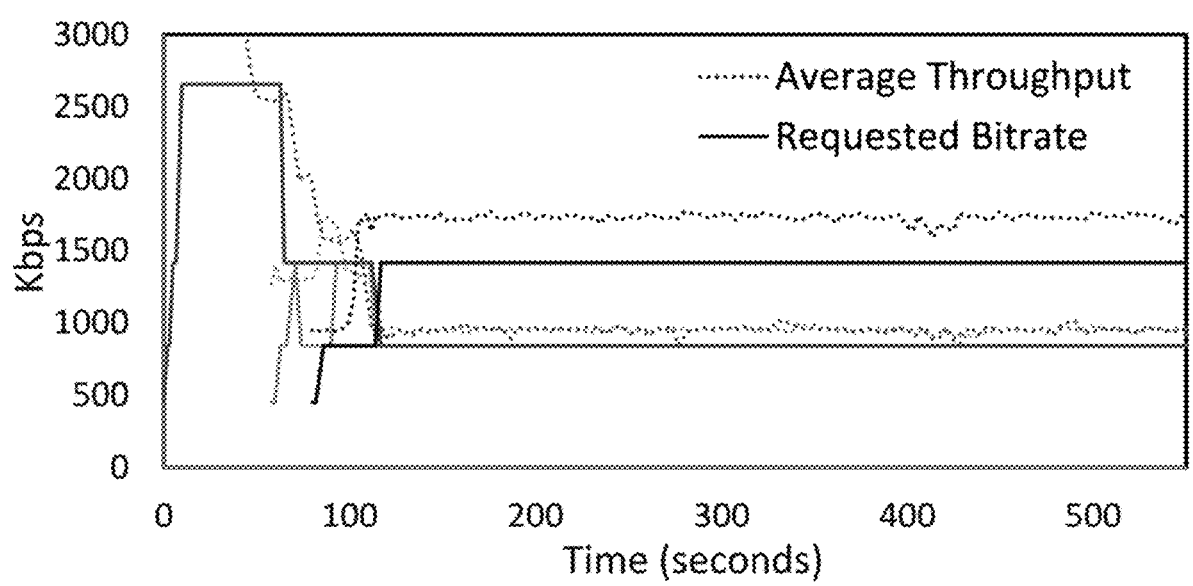
FIG. 4 is a graph illustrating that controlled player competition stabilizes competing players by maintaining video bitrates in accordance with various aspects described herein.

We prevent such fluctuations and provide improved stability compared to the previous experiment, which is evident from FIG. 4. Note that some embodiments are also designed to distribute bandwidth in a way that maximizes the requested bitrates. Hence, we can assign about 1850 Kbps to one device and 975 Kbps to the other two devices allowing them to stream 1416 Kbps and 843 Kbps bitrate profiles, respectively. Here, these are the maximum bitrates that the players can request without affecting stability. This reduces the total number of bitrate switches for all players from 66 in the uncontrolled experiment to only 15, while maintaining approximately the same overall quality (about 1125 Kbps on average in both experiments). Note that the 15 switches incurred were mostly during startup, not because of fluctuation in throughput.

Figure 5:
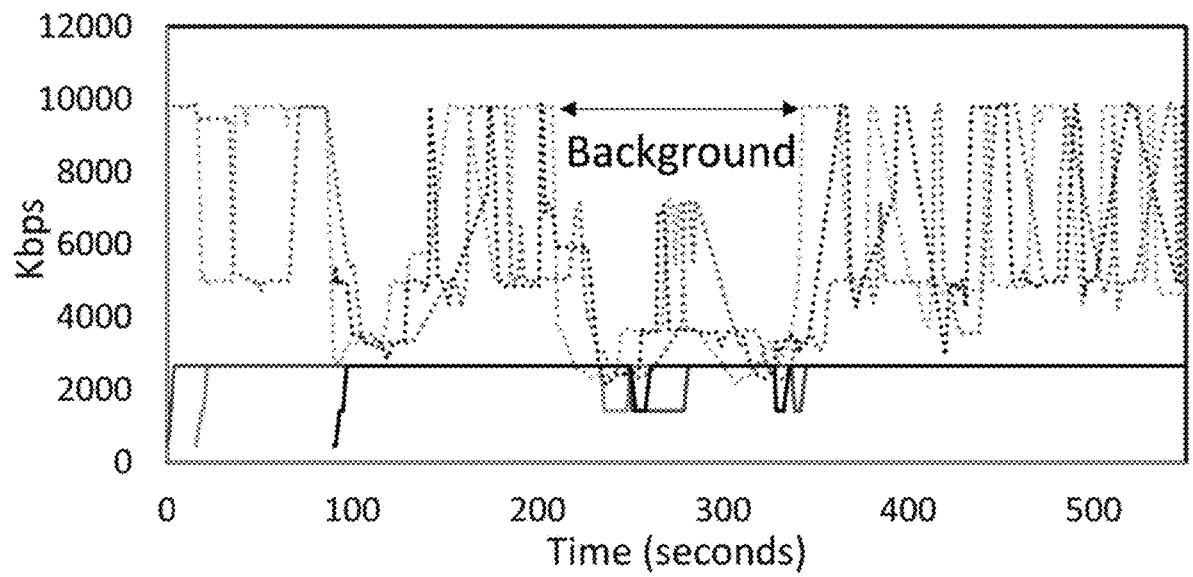
FIG. 5 is a graph illustrating that background traffic causes bitrate reduction in an uncontrolled case.

In practice, quality degradation and instability on mobile devices can also be caused by background traffic, such as automatic backup, cloud sync, or app updates. FIG. 5 shows the negative impact of background traffic on throughput and video bitrates even with enough bandwidth (10 Mbps) for all players to stream the highest quality profile without competition. After starting up all players, we use iperf one of the devices to initiate a TCP connection with an external host which lasts for two minutes starting at time 210. As the throughput is only tuned by the TCP congestion control, it is expected that the background traffic can get about a quarter of the bandwidth because of the TCP fair share mechanism. Consequently, a significant drop in the players average throughputs caused by the background traffic led to an aggressive competition among the players, results in a reduction in the video bitrates and fluctuation between 1416 and 2656 Kbps, until the background traffic stops at time 330. We repeat the previous experiment with select embodiments of our design and observe no clear impact on the video QoE of all players since the rate of background traffic is efficiently controlled.

Figure 6:
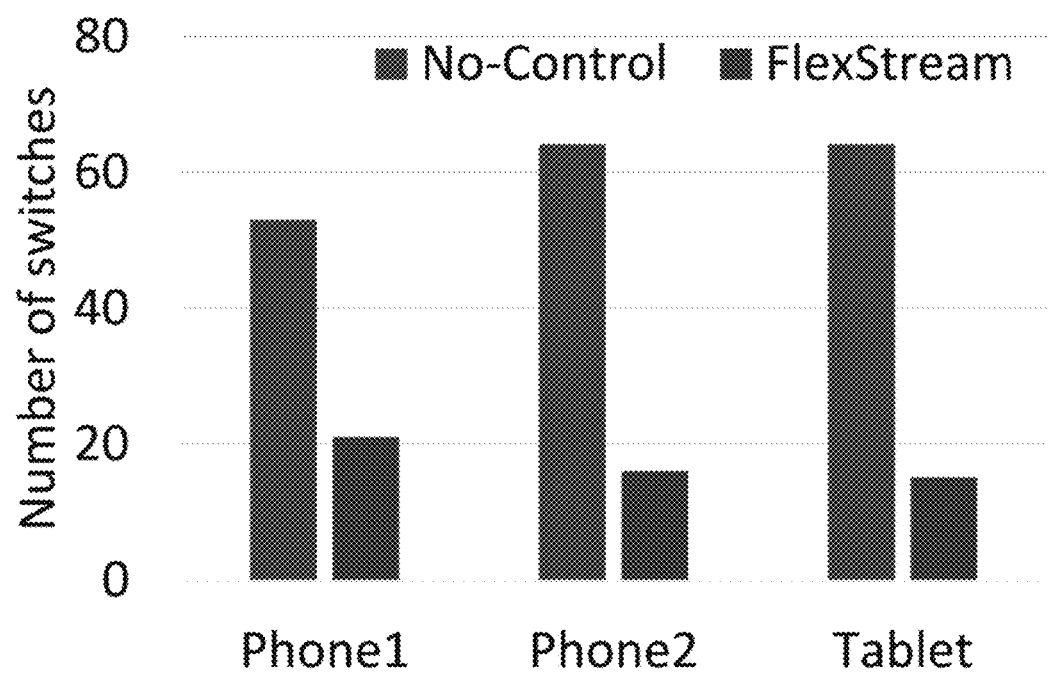
FIG. 6 is a chart illustrating that controlled player competition stabilizes video bitrates in accordance with various aspects described herein.

We repeated these experiments several times using different network capacities, starting from 2500 Kbps and increasing by 1500 Kbps until no competition between the players is observed at 8500 Kbps. The average number of switches for each device is shown in FIG. 6. We can observe a significant reduction in switching from over 60 for 2 devices in uncontrolled, to 20 or less, which confirms our distinct advantage.

Figure 7:
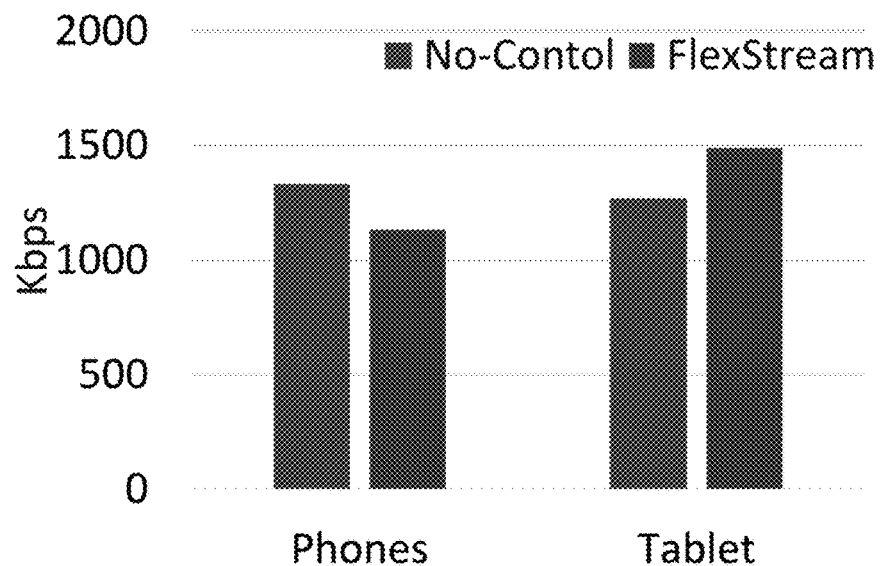
FIG. 7 is a chart illustrating video bitrates through application of a screen size-based policy in accordance with various aspects described herein.

We also improve fairness by considering device characteristics, such as by implementing screen size-based policy that favors larger screens when needed (e.g., tablet over phone). In the previous experiment (FIG. 4), we assigned the most bandwidth (1850 Kbps) to the tablet to stream better quality (1416 Kbps) than the two phones (843 Kbps). Therefore, the player on the tablet can have comparable viewing experience to players on the phones. FIG. 7 shows that the tablet with can get 350 Kbps higher bitrate on average than the two phones in contrast to the uncontrolled case, over a range of bottlenecks. Balancing the QoE is an important feature as in some scenarios such as a home network, it is possible to encounter competition between players with a large screen size differences, such as phones, laptops, and TVs.

Figure 8:
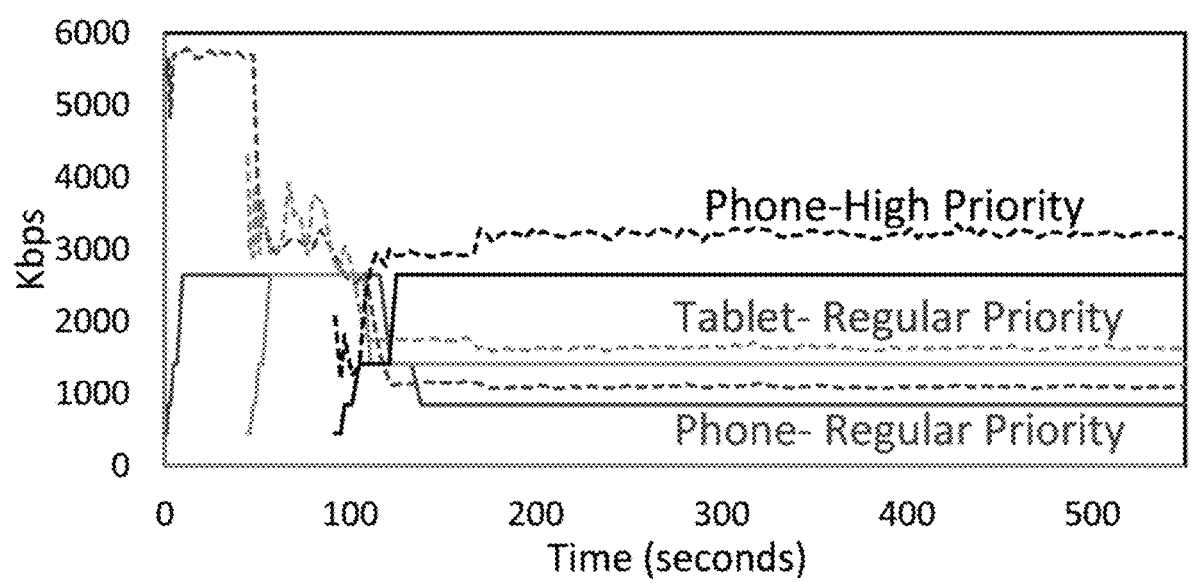
FIG. 8 is a graph illustrating stable bitrate control based on device priorities in accordance with various aspects described herein.

We can also differentiate between classes of devices, regular and high priority, and distribute bandwidth accordingly (FIG. 8). Two players, on the phone and tablet with regular priorities, start at time 0 and 50, respectively, and adapt to stream the highest quality (2656 Kbps) until a third player on another phone with high priority joins at time 100. Consequently, as the network capacity is oversubscribed, we can allocate more bandwidth to the high priority device (a phone) to stream the highest bitrate profile. The rest of the bandwidth is then divided between regular devices, while also considering the screen size.

Figure 9:
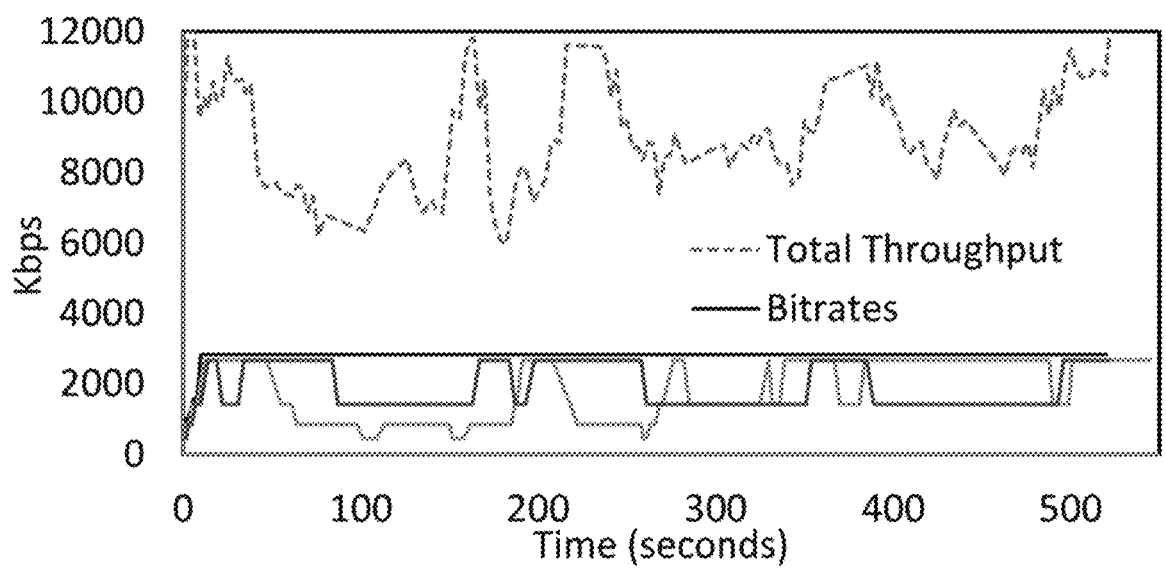
FIG. 9 is a graph illustrating instability and inefficiency with no coordinated bitrate control in accordance with various aspects described herein.
Figure 10:
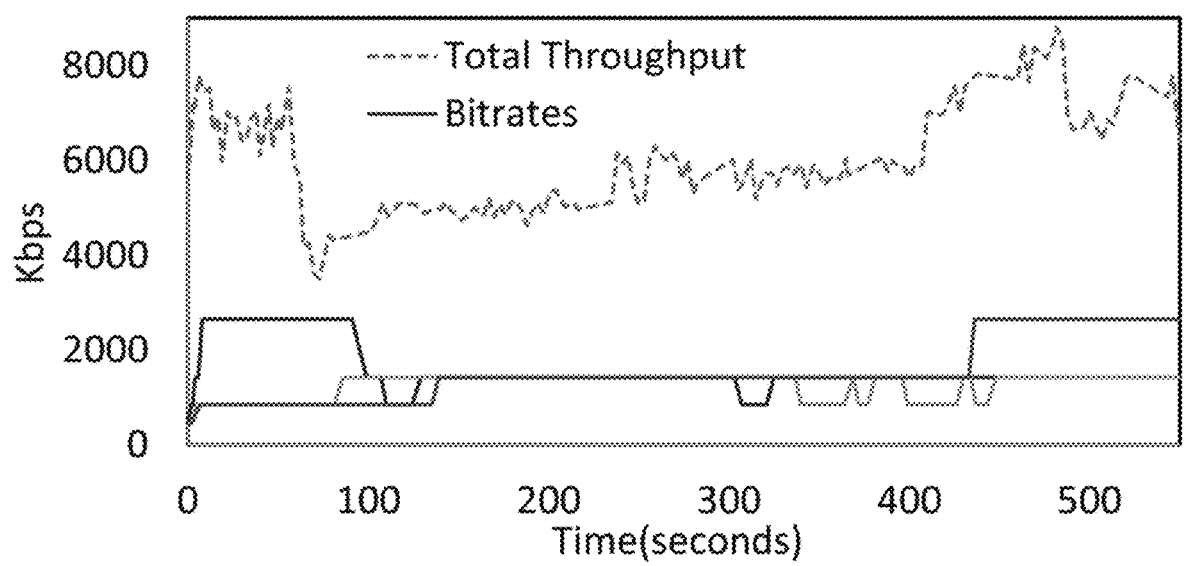
FIG. 10 is a graph illustrating stability and efficiency with coordinated bitrate control.

To demonstrate how well this can work in practice in the presence of uncontrolled background traffic, we conduct the same experiments on a major U.S. cellular carrier with three mobile devices. We select busy hours in a few loaded cells for our experiments, to compare between uncontrolled players and uncontrolled players as described herein. From FIG. 9, we can observe three main issues in the uncontrolled experiment due to the extreme fluctuation in the bandwidth: a large drop in the video bitrate (sometimes to the lowest bitrate profile), a significant instability in the bitrates, and unfairness in utilizing the bandwidth, results in unstable viewing experience among the end-users. On the other hand, even with this extreme dynamic network condition caused by competing players and high (and uncontrolled) background traffic, we can still provide good performance and mitigate the issues that appeared in the uncontrolled scenario as can be observed from FIG. 10.

To evaluate the performance in the presence of a sufficiently larger number of competing video flows, we developed an player emulator that runs on the same testbed as in the basic experiments. Similar to the real player, the emulator, implemented as a Java application, generated real traffic with a test HTTP server, which responds with dummy video segments equivalent in size and distribution to those used in the real experiment. The emulated player was developed with all the required functions with the exception of decoding and playing video segments. In all experiments, 12 emulated players, representing 8 phones and 4 tablets are used to stream over five different Wi-Fi AP capacities {7, 10, 13, 16, and 19 Mbps}, and set to randomly start during the first two minutes. For each capacity, we repeat the experiment 10 times and include more QoE metrics in the evaluation.

Figure 11:
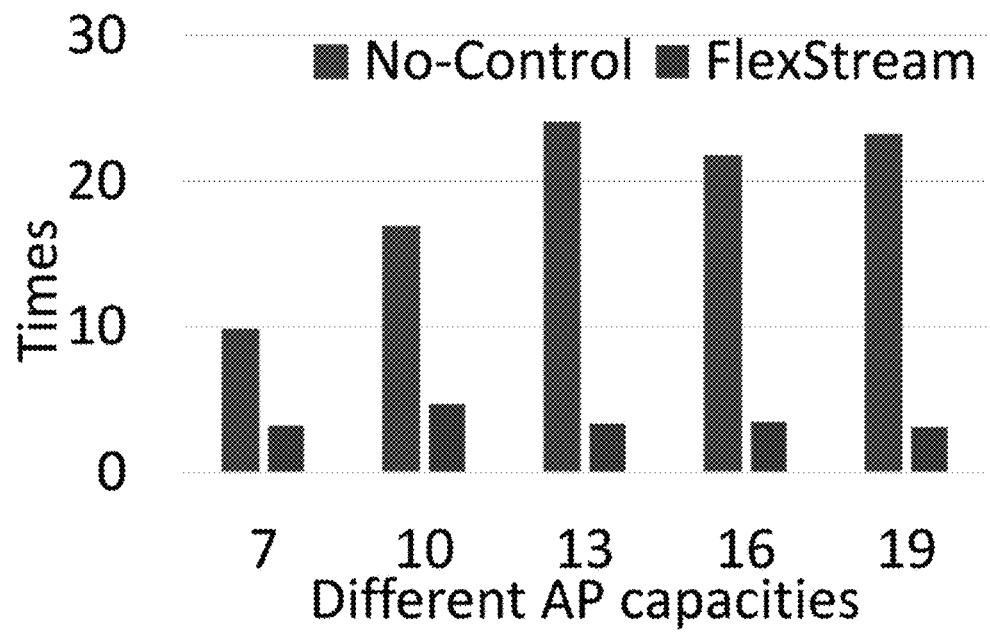
FIG. 11 is a chart illustrating reduced bitrate switching with coordinated bitrate control in accordance with various aspects described herein.

FIG. 11 compares stability of the video quality with and without control for each AP bottleneck capacity. Table 1 summarizes the performance statistics over all bottleneck capacities. It is clear that players with no control fail to provide a stable viewing experience. The average number of switches per player is between 10 and 24. On the other hand, control substantially improves stability in each case, with the average number of switches reduced by 81% from 19.1 to 3.6.

TABLE 1

Average performance metrics for 12 players.

| | No Control | FlexStream |
|---|---|---|
| Instability (switches) | 19.1 | 3.6 |
| Number of stalls | 10.6 | 1.0 |
| Stall duration | 40.6 s | 3.1 s |
| Startup delay | 7.9 s | 4.4 s |
| Tablets bitrate difference | 20 Kbps | 196 Kbps |
| Fairness (JFI) | 0.90 | 0.96 |

Figure 12:
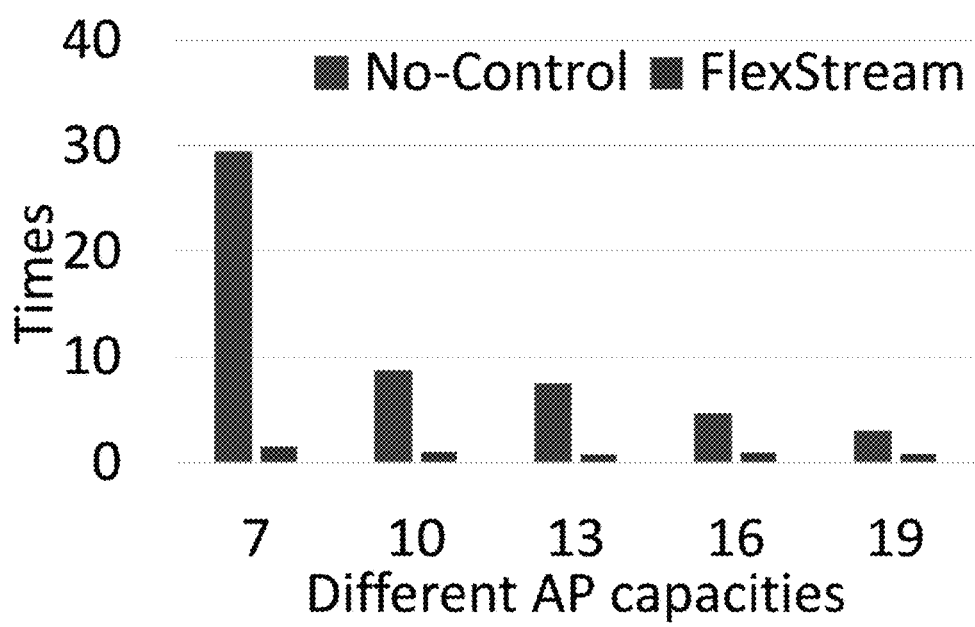
FIG. 12 is a chart illustrating reduced stalls with coordinated bitrate control in accordance with various aspects described herein.
Figure 13:
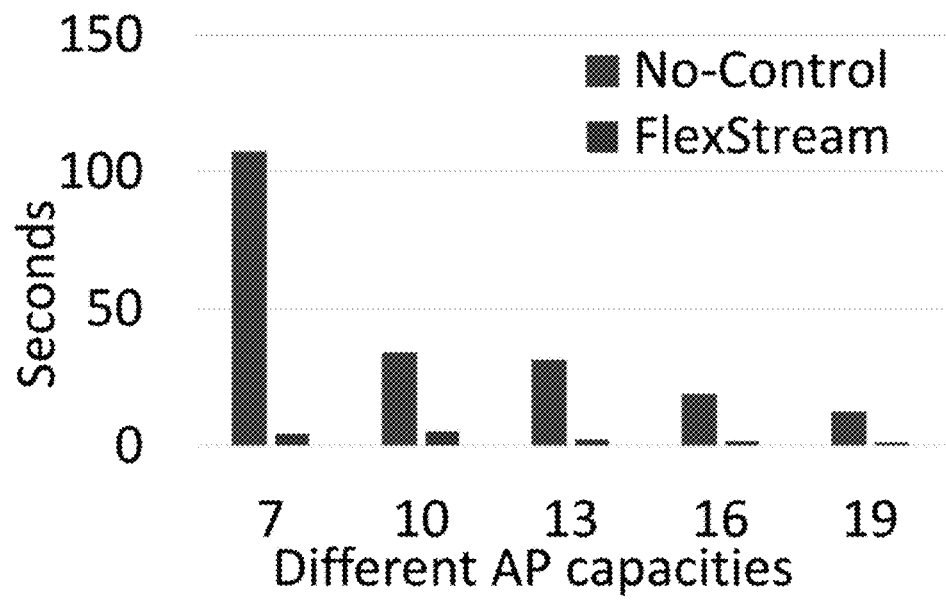
FIG. 13 is a chart illustrating reduces stall duration with coordinated bitrate control in accordance with various aspects described herein.

Player competition not only causes instability, but can also lead to playback stalls resulting in a severe QoE degradation. FIG. 12 shows the average number of stalls per bottleneck capacity. The average duration of stalls is also unacceptably high and follows the same trend, as shown in FIG. 13. In all experiments, adding control shows outstanding performance by reducing the average number of stalls by 91% (from 10.6 to 1.0), and lowering the average stall duration by 92% (from 40.6 to 3.1 s). Table 1 also shows that there is a significant improvement in startup delay with control, with startups becoming faster by 44% on average (from 7.9 to 4.4 s), since the competition among players is now avoided.

Figure 14:
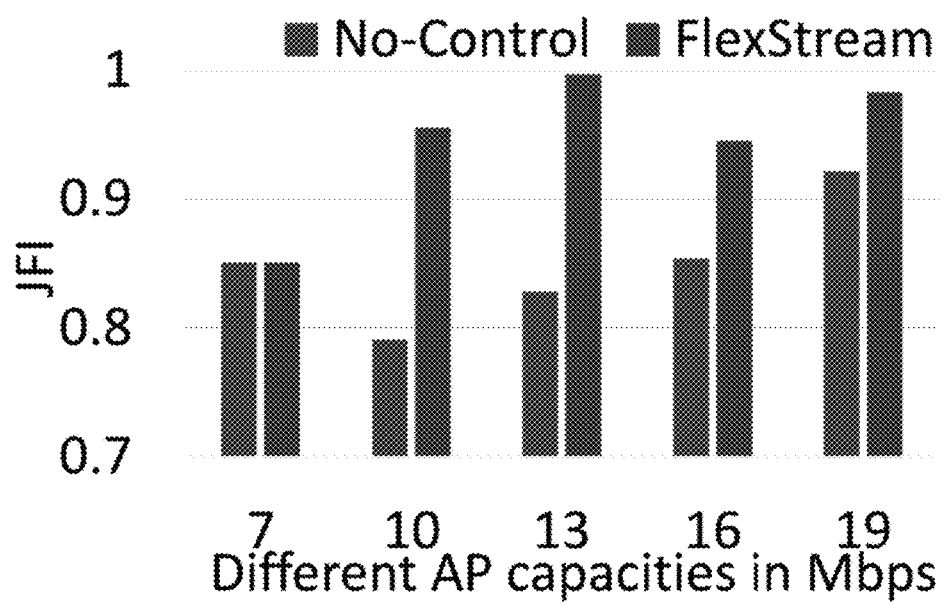
FIG. 14 is a chart illustrating a comparison of average Jain's Fairness Index between an uncontrolled case and a controlled case in accordance with various aspects described herein.
Figure 15:
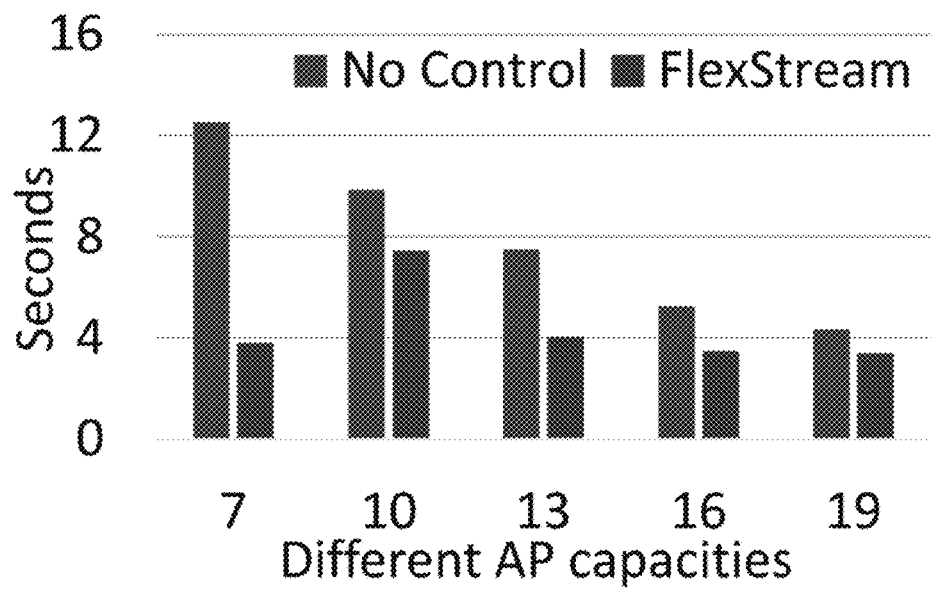
FIG. 15 is a chart illustrating a comparison of average startup delays between an uncontrolled case and a controlled case in accordance with various aspects described herein.

Control, as described herein, further addresses fair allocation of bandwidth among players taking into consideration their capabilities, such as screen sizes. The Tablets bitrate difference entry in Table 1 refers to the average bitrate difference achieved by tablets over phones, where tablets with our control can obtain 196 Kbps higher bitrate on average than the phones. Moreover, our control improves fairness among devices of the same screen size (e.g., phones or tablets). FIG. 14 compares fairness in the average requested bitrate among phones using Jain's Fairness Index (JFI) [19], where higher values mean better fairness. Across all capacities, our FlexStream control improves JFI, and significantly so for 7, 10, and 13 Mbps bottleneck. The overall JFI across all devices (including phones and tablets) and scenarios is increased by 0.06 as indicated in Table 1.

Figure 16:
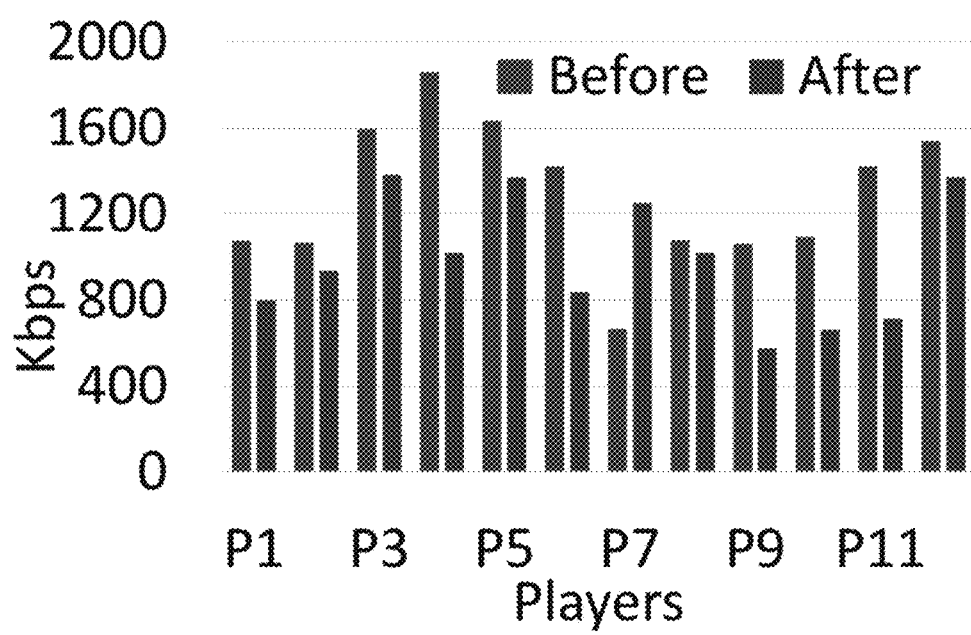
FIG. 16 is a chart illustrating a comparison of background traffic degradation of bitrates between an uncontrolled case and a controlled case in accordance with various aspects described herein.

To study the impact of background traffic with many players, the experiments in FIG. 16 shows the average video bitrate one minute before and after generating a TCP flow via iperf. It is clear from the figure that all players are impacted resulting in an average drop by ≈300 Kbps, with up to 800 Kbps for one player. As expected, we do not observe any bitrate switches or a significant drop in average bitrates with FlexStream control as it controls and shapes the background traffic.

Figure 17:
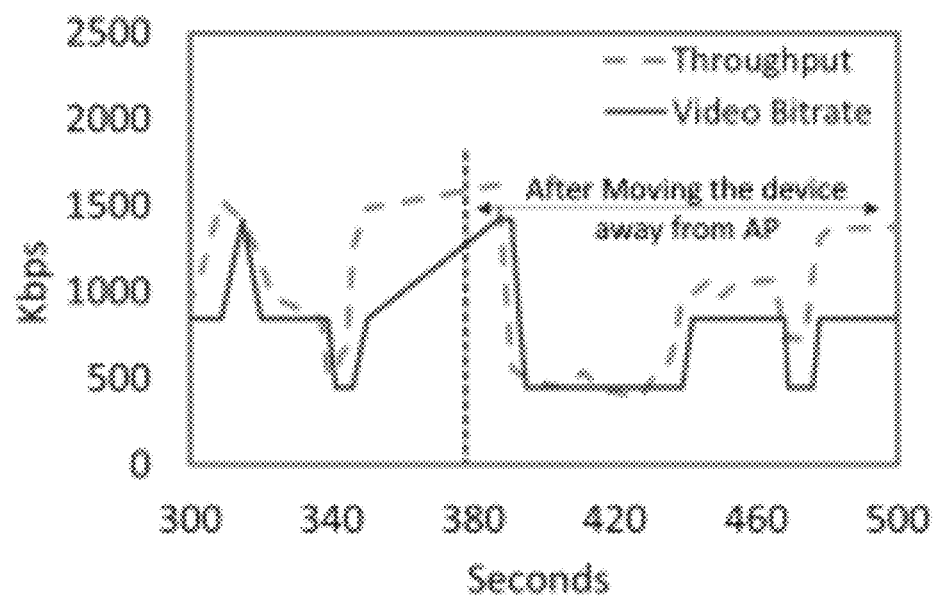
FIG. 17 is a graph illustrating the impact of signal quality on Quality of Experience without coordinated bitrate control in accordance with various aspects described herein.
Figure 18:
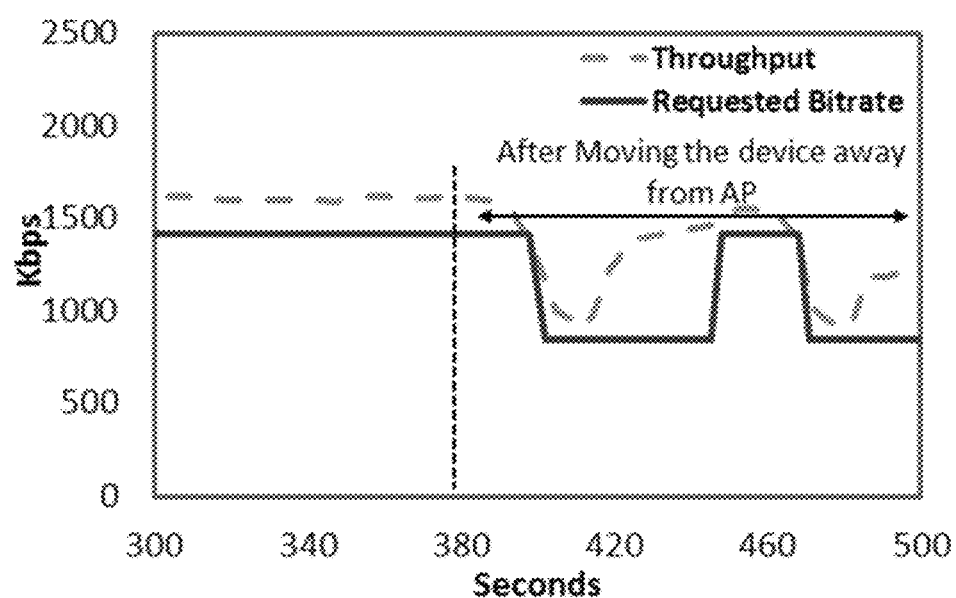
FIG. 18 is a graph illustrating the impact of signal quality on Quality of Experience with coordinated bitrate control in accordance with various aspects described herein.

To study the impact of the wireless link conditions on the video QoE, we place the devices at different distances from the AP. We move one player further away to weaken the signal. FIG. 17 and FIG. 18 show the throughput and video bitrates requested by this player without and with FlexStream, respectively. The drop in the throughput at time 380 when the device is moved is much worse in the uncontrolled case than with FlexStream. In uncontrolled case, the player lowers the bitrate to the lowest level compared to only one level and better stability with FlexStream, since it protects the bandwidth share of the player although its throughput is affected by the radio signal.

We evaluate the computation and bandwidth requirements of FlexStream on an end device. Using GPAC on a mobile phone to stream a video encoded at 1.4 Mbps while DA is running in the background, we measure CPU utilization and average data downloaded and uploaded. As expected, we find that DA incurs a negligible overhead for both metrics. The CPU usage is around 1%, while there is only about 800 bits/second on average added to the bandwidth used by video traffic, which constitutes less than 0.00004% of the total bandwidth.

Figure 19:
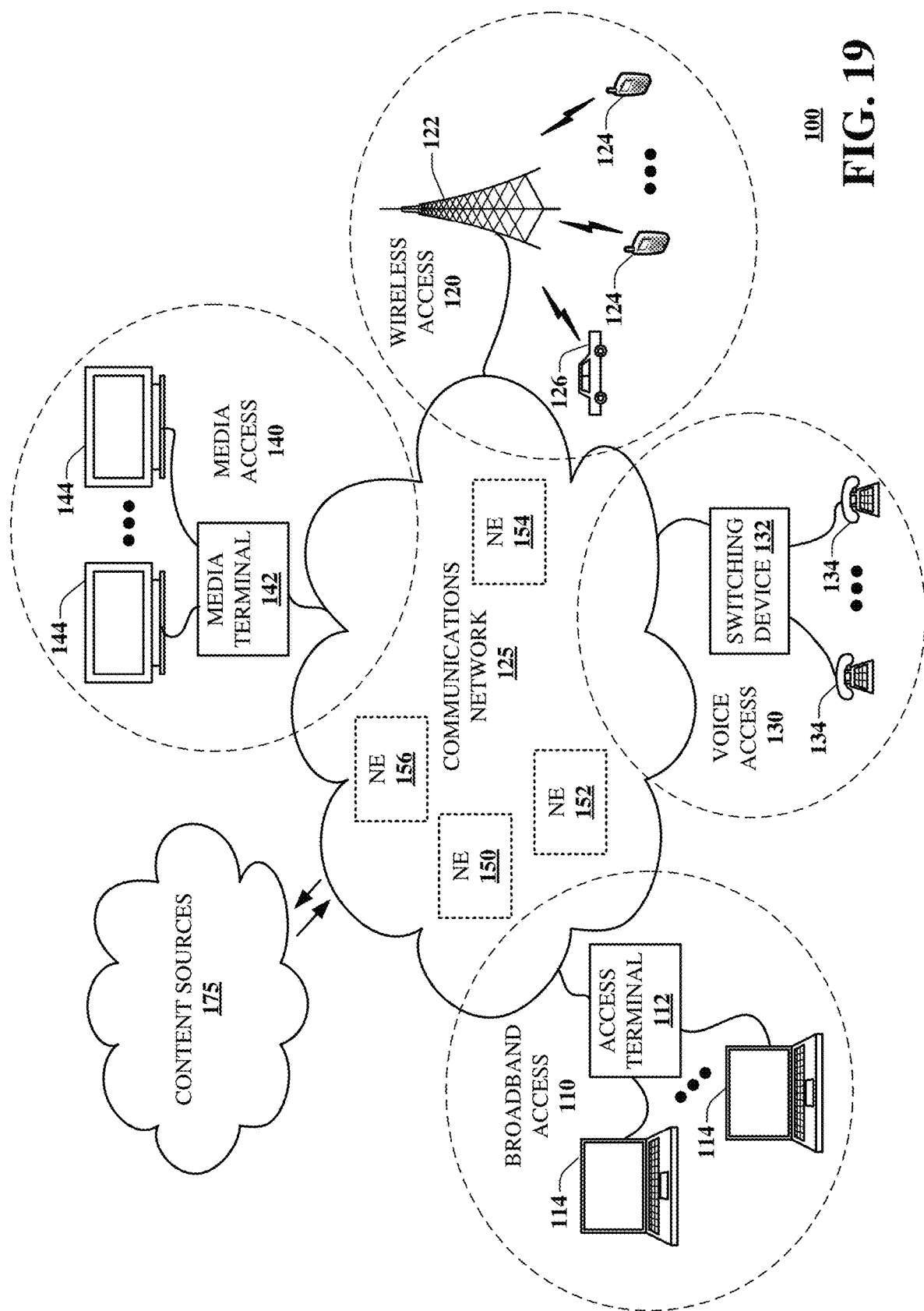
FIG. 19 is a block diagram illustrating an example, non-limiting embodiment of a communications network in accordance with various aspects described herein.

Referring now to FIG. 19, a block diagram is shown illustrating an example, non-limiting embodiment of a communications network 100 in accordance with various aspects described herein. For example, communications network 100 can facilitate in whole or in part data streaming, such as video streaming, as described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 20:
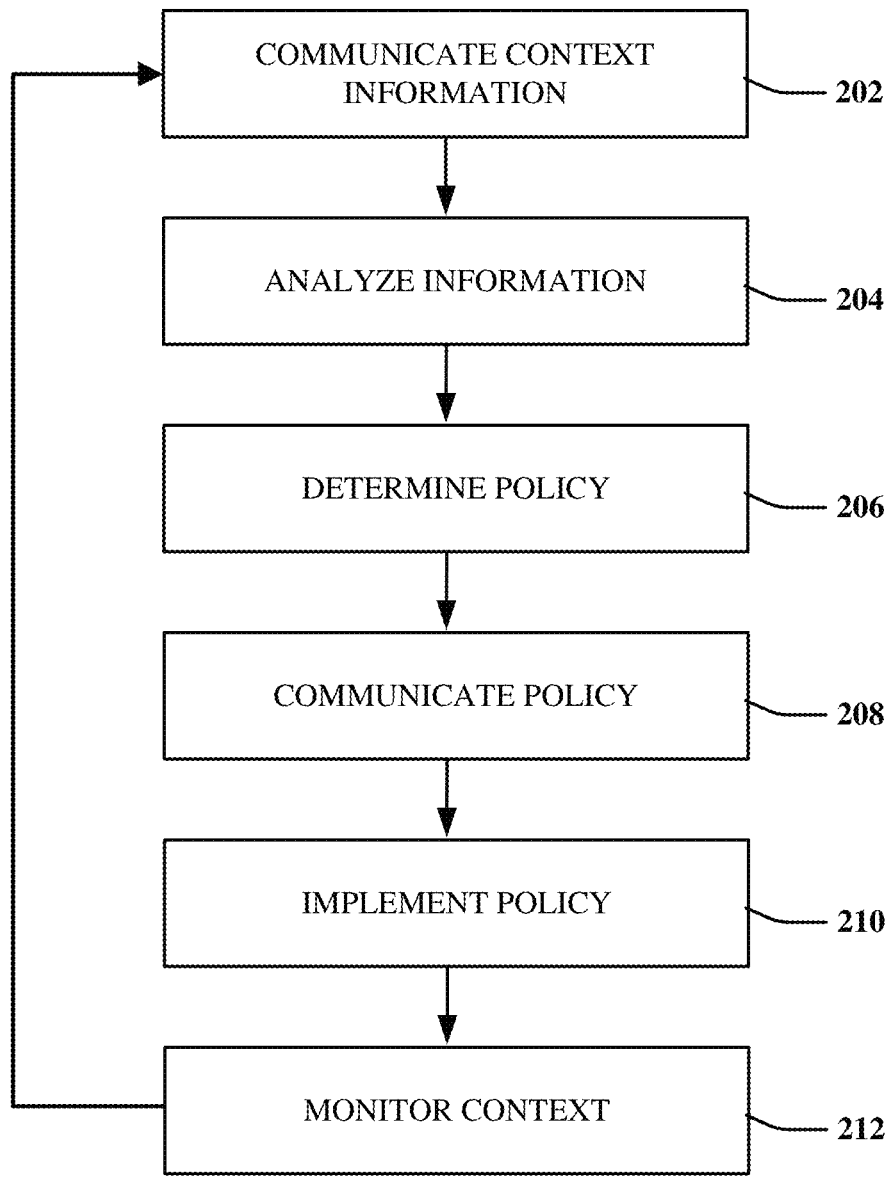
FIG. 20 depicts an illustrative embodiment of a method in accordance with various aspects described herein.

FIG. 20 depicts an illustrative embodiment of a method 200 in accordance with various aspects described herein. The end devices may be any of the data terminals 114, mobile devices 124, vehicle 126, display devices 144 or other wireless and/or mobile devices. The end devices may each be different devices, may have different situations, have different users, or any combination thereof. For purposes of simplicity, we refer to each devices differences, situation, and/or user as that device's context. Thus, a device's context may comprise the device's screen size, the device's orientation, the device's priority, the device's network connection/congestion/signal, the device's capabilities, the device's CPU/processor, the device's screen resolution, ambient lighting at the device, ambient noise at the device, a specific application the device is running, a specific service the device is attempting to access, a current engagement level of the device's user, (i.e. whether the user is asleep, looking at the device or away from the device, etc.), the device user's priority, similar situational differences, or any combination thereof.

As shown in 202, the end device 101 communicates its context information to a system controller 102, such as the FlexStream controller of FIG. 1 and FIG. 2. The system controller 102 may be a stand-alone server, embodied in one of the network elements 150,152,154,156, or otherwise reside on the network 125. In at least some embodiments, as described above with respect to FIG. 1 for example, the end device 101 communicates its context information to the system controller 102 over a control channel as opposed to a data channel, over which content (such as media content) is normally communicated.

As shown in 204 and 206, the system controller 102 analyzes available information and sets polices for each end device, thereby allocating system-wide resources. In some embodiments, there are multiple system controllers, each allocating regional or local system resources. For example, the system controller 102 may analyze network congestion, available bandwidth, etc. across all devices in order to discern overall system characteristics.

These policies may be different for each device and/or may be similar for similarly situated devices. The system controller 102 may look for high priority users and/or devices requesting to open a data channel for a video streaming session, for example, and attempt discern what bitrate they can efficiently use. For example, emergency workers may be given higher priority and thus higher bitrates, or more bandwidth, than normal or lower priority users, especially in an emergency/disaster situation. This may be done based on location, based on the device and/or the user, or any combination thereof. For example, $1^{st}$ responders may be given higher priority near an emergency location, but a lesser priority far from the emergency location. Alternatively, emergency workers may be given higher priority independent of their location. Similarly, some users may subscribe to higher priority plans than other users. Additionally, some devices may be given higher priority than other devices, independently of their user, such as during a promotional period. Priorities may also be continuing, temporary and/or location based.

The system controller 102 may then consider the capabilities of each device 101. For example, devices with larger and/or higher resolution screens, faster processors, and/or more memory may be better able to utilize higher bit rates or bandwidths than less capable devices. On the other hand, devices with less capabilities, or weaker signals, may simply not be able to properly/effective/efficiently utilize higher bit rates or bandwidths, and therefore higher bit rates or bandwidths may be essentially wasted on them. Similarly, users of end devices with brighter ambient lighting and/or in high noise areas may not be able appreciate higher quality video associated with higher bit rates or bandwidths. Additionally, when the user is not engaged with the device, such as when they are looking away from the device, that user may not be able appreciate higher quality video associated with higher bit rates or bandwidths. The system controller 102 may assign higher or lower bit rates or bandwidths to each device 101 considering any or all of this information to maximize QoE and avoid possible waste of system resources.

In some embodiments, the system controller 102 will also consider which specific application the device is running and/or a specific service the device is attempting to access. For example, the system controller 102 may assign higher or lower bit rates or bandwidths to different streaming services and/or web browsers.

As shown in 208, the different polices are communicated to the different end devices 101 over one or more control channels. As shown in 210, upon receipt of the policy assigned to any specific end device 101, that device 101 implements the policy as described above. For example, the end device 101 may establish a video streaming session over a data channel connection to a media server 103 according to the policy for that device 101. The end device 101 itself, rather than the system controller 102, may manage the video streaming session according to the policy for that device 101. This frees up system resources, such as the system controller, network elements 150, 152, 154, 156, and/or other system resources, as they need not actively manage the end devices and/or the data to/from them. The media server 103 may be embodied in one or more of the content sources 175 or otherwise reside on the network 125.

As shown in 212, the end devices 101 and system controller 102 may continue to monitor context and/or other information and modify policies as the context and/or other information changes. In some embodiments, when a new policy is communicated to a device, that device immediately implements that new policy to control active and subsequent data channel communications.

While for purposes of simplicity of explanation, the respective processes are shown and described as a series of blocks in FIG. 20, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 21:
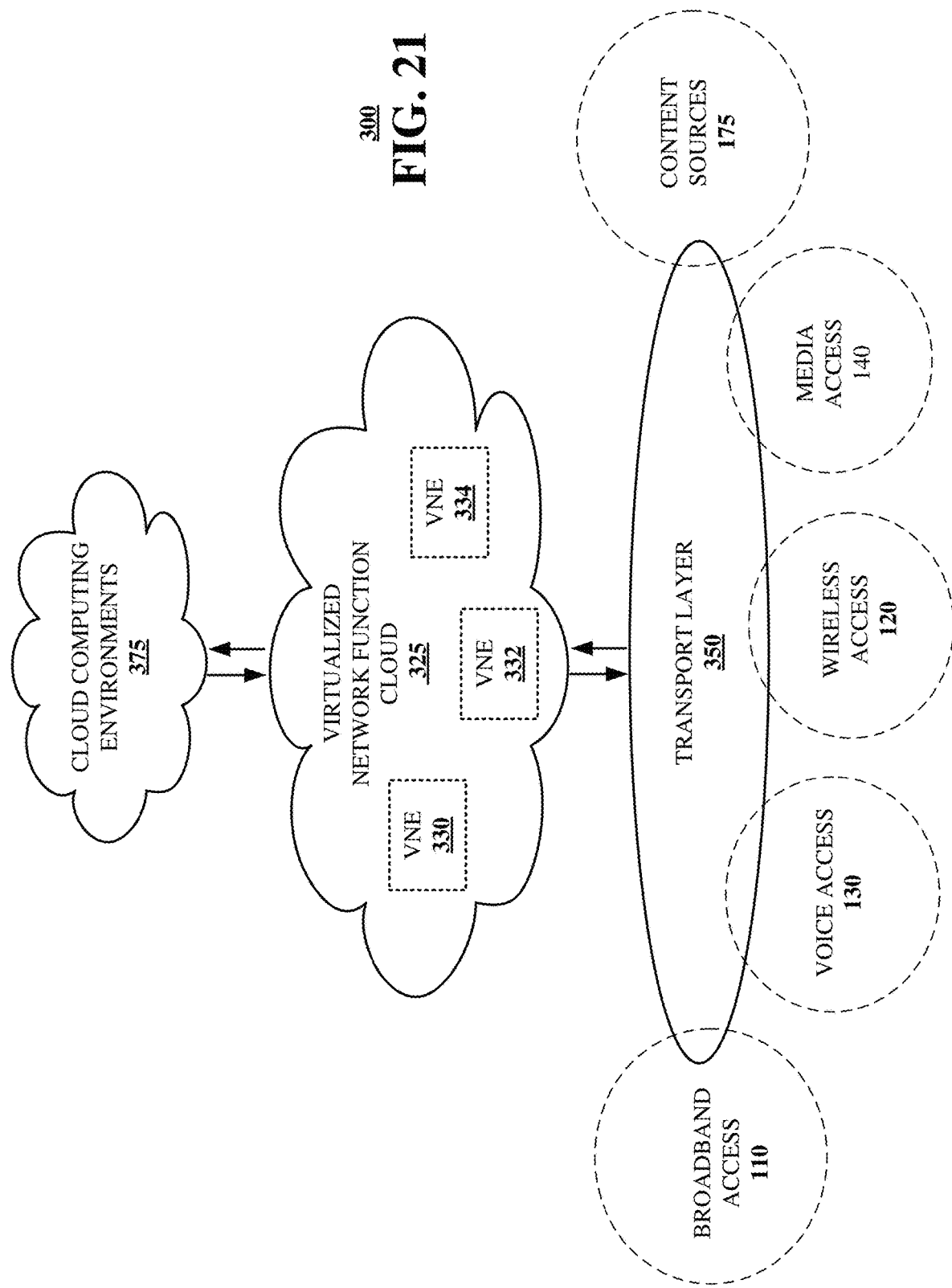
FIG. 21 is a block diagram illustrating an example, non-limiting embodiment of a virtualized communication network in accordance with various aspects described herein.

Referring now to FIG. 21, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions, and described in connection with, method 200 presented in FIGS. 19, 20, and 21. For example, virtualized communication network 300 can facilitate in whole or in part data streaming, such as video streaming, as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 19), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 22:
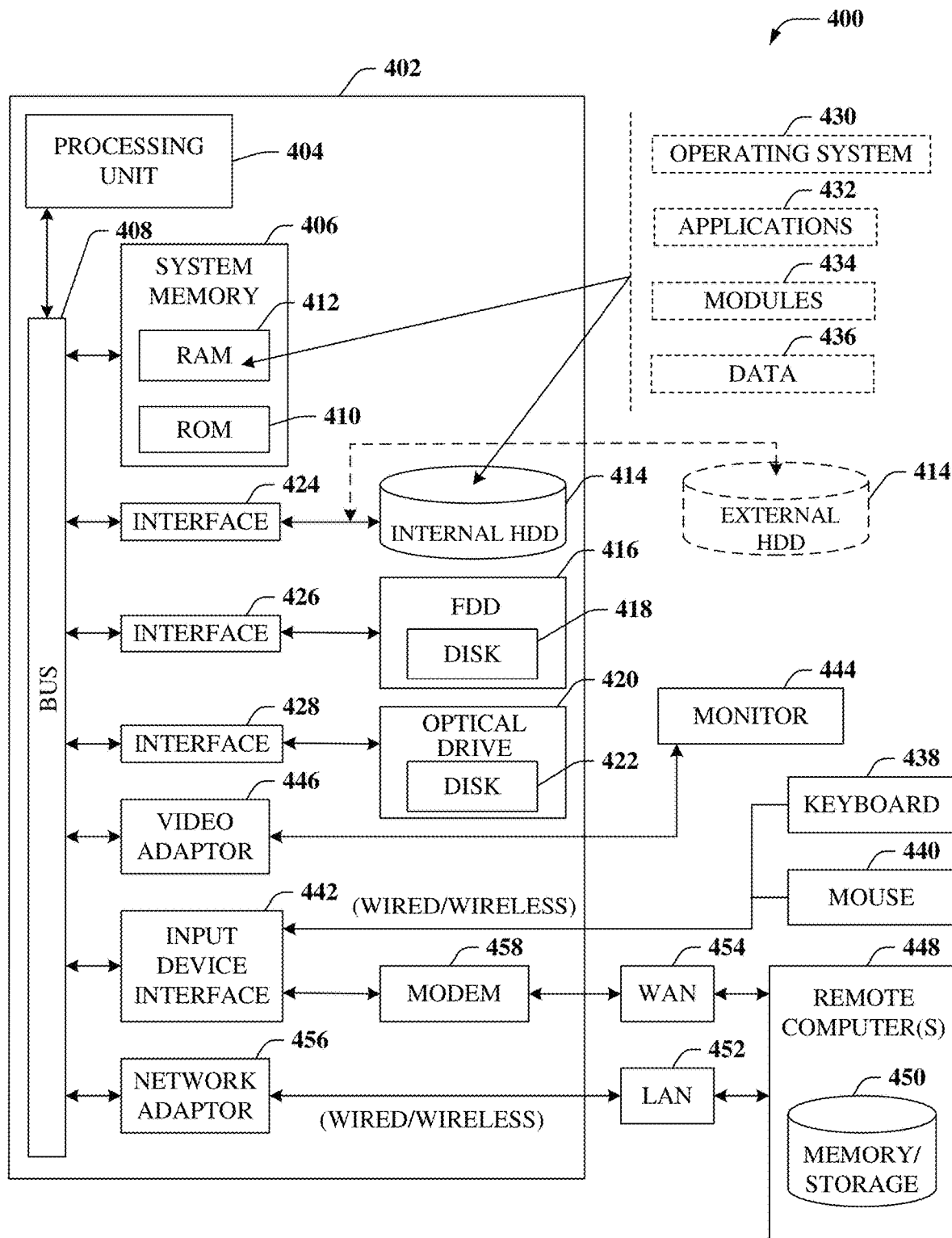
FIG. 22 is a block diagram of an example, non-limiting embodiment of a computing environment in accordance with various aspects described herein.

Turning now to FIG. 22, there is illustrated a block diagram of a computing environment in accordance with various aspects described herein. In order to provide additional context for various embodiments of the embodiments described herein, FIG. 22 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part data streaming, such as video streaming, as described herein.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 22, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 23:
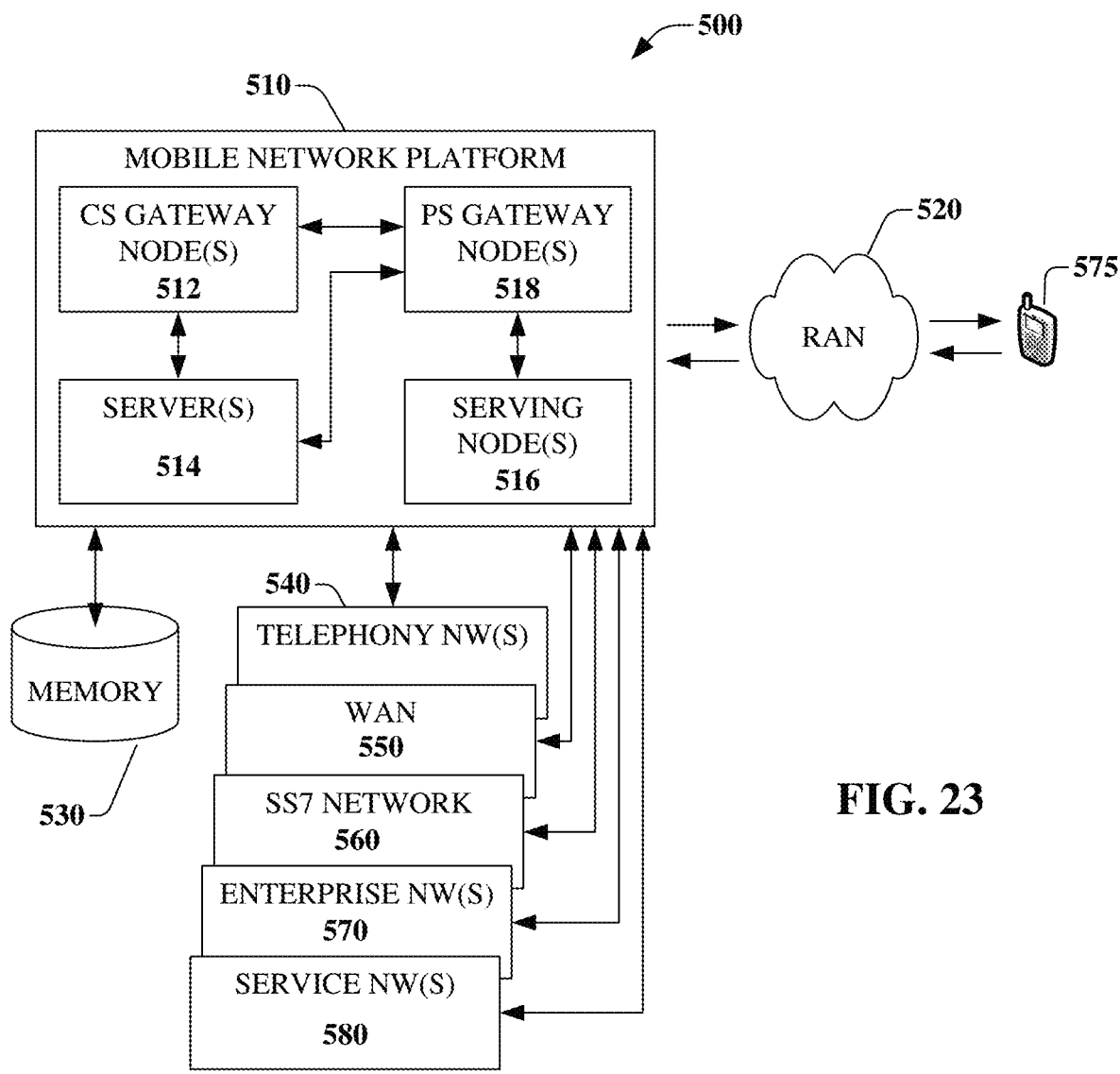
FIG. 23 is a block diagram of an example, non-limiting embodiment of a mobile network platform in accordance with various aspects described herein.

Turning now to FIG. 23, an embodiment 500 of a mobile network platform 510 is shown that is an example of network elements 150, 152, 154, 156, and/or VNEs 330, 332, 334, etc. For example, platform 510 can facilitate in whole or in part data streaming, such as video streaming, as described herein. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antennas networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 23, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 24:
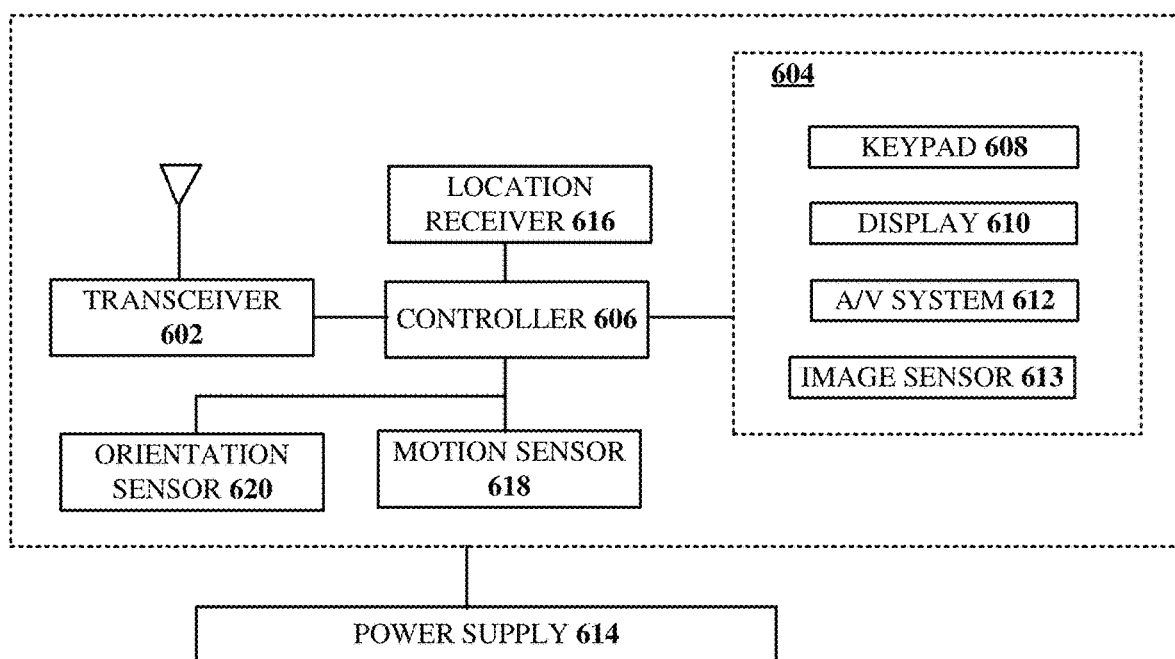
FIG. 24 is a block diagram of an example, non-limiting embodiment of a communication device in accordance with various aspects described herein.

Turning now to FIG. 24, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part data streaming, such as video streaming, as described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 24 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system comprising:
a processor operating as a mobile network edge node; and
a memory that stores executable instructions that, when executed by the processor, facilitate performance of operations, the operations comprising:
facilitating establishing a first control channel with a first mobile wireless device, the first control channel being a dedicated channel to receive context information including first context information and to transmit policy information including a first policy and policy decisions, wherein the first control channel is not utilized to communicate video content;
obtaining the first context information from the first mobile wireless device through the first control channel;
determining the first policy according to the first context information, wherein the first policy assigns a first video streaming bit rate to the first mobile wireless device based on the first context information;
providing the first policy to the first mobile wireless device over the first control channel, causing the first mobile wireless device to implement the first policy to control a first video streaming session between the first mobile wireless device and a media server over a first data channel that is distinct from the first control channel, wherein the first data channel does not transmit the context information and does not transmit the policy information, and wherein the media server is operated by a content provider and is separate from the mobile network edge node;
receiving second bitrate switching information from a second mobile wireless device engaged in a second video streaming session to the second mobile wireless device from the media server over a second data channel, wherein the first and second mobile wireless devices compete for throughput;
receiving additional context information and first bitrate switching information from the first mobile wireless device through the first control channel, the first bitrate switching information indicating switching from utilizing the first video streaming bit rate by the first mobile wireless device during at least a portion of the first video streaming session; and
revising the first policy based on the first context information, the first bitrate switching information and the second bitrate switching information.

2. The system of claim 1, wherein the first context information includes information about the first mobile wireless device.

3. The system of claim 2, wherein the first context information includes information about a capability of the first mobile wireless device selected from the group consisting of a screen size of the first mobile wireless device, a screen resolution of the first mobile wireless device, a processor of the first mobile wireless device, and a memory capacity of the first mobile wireless device.

4. The system of claim 2, wherein the first context information includes information about an ambient lighting at the first mobile wireless device.

5. The system of claim 2, wherein the first context information includes information about a network connection of the first mobile wireless device.

6. The system of claim 1, wherein the first context information includes information about a first user of the first mobile wireless device.

7. The system of claim 6, wherein the first context information includes information about an engagement of the first user with the first mobile wireless device.

8. The system of claim 6, wherein the first context information includes an indication of whether the first user is looking at the first mobile wireless device.

9. The system of claim 1, the operations further comprising:
obtaining second context information from the second mobile wireless device through a second control channel;
determining a second policy according to the first context information and the second context information, wherein the second policy assigns a second video streaming bit rate to the second mobile wireless device based on the second context information; and
providing the second policy to the second mobile wireless device over the second control channel, causing the second mobile wireless device to implement the second policy to control the second video streaming session, wherein the first context information is different from the second context information, wherein the first policy is different from the second policy such that the first video streaming bit rate is different than the second video streaming bit rate.

10. A non-transitory machine-readable medium, comprising executable instructions that, when executed by a processing system including a processor, facilitate performance of operations, the operations comprising:
receiving first context information from a first mobile wireless device through a first control channel, the first control channel being a dedicated channel to receive context information including first context information and to transmit policy information including a first policy and policy decisions, wherein the first control channel is not utilized to communicate video content;
determining a first policy according to the first context information, wherein the first policy assigns a first video streaming bit rate for communications between the first mobile wireless device and a media server over a first data channel based on the first context information;
transmitting the first policy to the first mobile wireless device over the first control channel, wherein upon receipt of the first policy the first mobile wireless device implements the first policy;
receiving first bitrate switching information from the first mobile wireless device through the first control channel, the first bitrate switching information indicating switching from utilizing the first video streaming bit rate by the first mobile wireless device during at least a portion of a video streaming session;
receiving second bitrate switching information from a second mobile wireless device engaged in a second video streaming session to the second mobile wireless device from the media server over a second data channel, wherein the first and second mobile wireless devices compete for throughput;
revising the first policy based on the first context information, the first bitrate switching information and the second bitrate switching information; and
providing the first policy to the first mobile wireless device over the first control channel, causing the first mobile wireless device to implement the first policy to control a first video streaming session between the first mobile wireless device and a media server over a first data channel that is distinct from the first control channel, wherein the first data channel does not transmit the context information and does not transmit the policy information, and wherein the media server is operated by a content provider and is separate from a mobile network edge node.

11. The non-transitory machine-readable medium of claim 10, wherein the first context information includes information about the first mobile wireless device selected from the group consisting of an ambient lighting at the first mobile wireless device, a screen size of the first mobile wireless device, a screen resolution of the first mobile wireless device, a processor of the first mobile wireless device, and a memory capacity of the first mobile wireless device.

12. The non-transitory machine-readable medium of claim 10, wherein the first context information includes information about a first user of the first mobile wireless device.

13. The non-transitory machine-readable medium of claim 12, wherein the first context information includes information about an engagement of the first user with the first mobile wireless device.

14. The non-transitory machine-readable medium of claim 10, the operations further comprising:
receiving second context information from the second mobile wireless device through a second control channel;
determining a second policy according to the second context information, wherein the second policy assigns a second video streaming bit rate for communications between the second mobile wireless device and the media server over a second data channel based on the second context information; and
transmitting the first policy to the first mobile wireless device over the first control channel, wherein upon receipt of the first policy the first mobile wireless device implements the first policy, wherein the first context information is different from the second context information, wherein the first policy is different from the second policy such that the first video streaming bit rate is different than the second video streaming bit rate.

15. A method comprising:
sending first context information from a first mobile wireless device through a first control channel to a network server, the first control channel being a dedicated channel to transmit context information including first context information and to receive policy information including a first policy and policy decisions, wherein the first control channel is not utilized to communicate video content;
receiving a first policy at the first mobile wireless device from the network server, wherein the first policy assigns a first video streaming bit rate to the first mobile wireless device based on the first context information;
implementing the first policy to control a first video streaming session between the first mobile wireless device and a media server over a first data channel;
sending first bitrate switching information from the first mobile wireless device to the network server through the first control channel, the first bitrate switching information indicating switching from utilizing the first video streaming bit rate by the first mobile wireless device during at least a portion of the first video streaming session;
receiving over the first control channel, a revised first policy from the network server, the revised first policy based on the first context information, the first bitrate switching information and second bitrate switching information obtained from a second mobile wireless device engaged in a second video streaming session with the media server over a second data channel, wherein the first and second data channels compete for a common bandwidth; and
implementing the revised first policy to control a first video streaming session between the first mobile wireless device and a media server over a first data channel that is distinct from the first control channel, wherein the first data channel does not transmit the context information and does not transmit the policy information, and wherein the media server is operated by a content provider and is separate from a mobile network edge node.

16. The method of claim 15, further comprising:
monitoring and storing a history of a number of switches from utilizing the first video streaming bit rate by the first mobile wireless device during the first video streaming session; and
generating the first bitrate switching information according to the history of the number of switches,
wherein the first context information includes information about a capability of the first mobile wireless device selected from the group consisting of a screen size of the first mobile wireless device, a screen resolution of the first mobile wireless device, a processor of the first mobile wireless device, and a memory capacity of the first mobile wireless device.

17. The method of claim 16, further comprising monitoring and storing a time of a last video streaming bit rate switch, wherein the generating the first bitrate switching information is based in part on the time of the last video streaming bit rate switch.

18. The method of claim 15, wherein the first context information includes information about a first user of the first mobile wireless device, information about an ambient lighting at the first mobile wireless device, or a combination thereof.

19. The method of claim 18, wherein the first context information includes information about an engagement of the first user with the first mobile wireless device.

20. The method of claim 15, further comprising:
obtaining second context information from the second mobile wireless device through a second control channel;
determining a second policy according to the first context information and the second context information, wherein the second policy assigns the second video streaming bit rate to the second mobile wireless device based on the second context information; and
providing the second policy to the second mobile wireless device over the second control channel, causing the second mobile wireless device to implement the second policy to control the second video streaming session to the second mobile wireless device from the media server over a second data channel, wherein the first context information is different from the second context information, wherein the first policy is different from the second policy such that the first video streaming bit rate is different than the second video streaming bit rate.

* * * * *